United States Patent
Walsh

(10) Patent No.: US 12,141,558 B2
(45) Date of Patent: Nov. 12, 2024

(54) SYSTEM AND METHOD FOR TAILORING A CUSTOMIZER FOR INTEGRATION PROCESS MODELING VISUAL ELEMENT TO A DOMAIN SPECIFIC LANGUAGE FOR BUSINESS INTEGRATIONS

(71) Applicant: BOOMI, INC., Round Rock, TX (US)

(72) Inventor: Jason R. Walsh, Ardmore, PA (US)

(73) Assignee: BOOMI, LP, Chesterbrook, PA (US)

( * ) Notice: Subject to any disclaimer, the term of this patent is extended or adjusted under 35 U.S.C. 154(b) by 0 days.

(21) Appl. No.: 16/943,816

(22) Filed: Jul. 30, 2020

(65) Prior Publication Data

US 2022/0035606 A1 Feb. 3, 2022

(51) Int. Cl.
*G06F 8/38* (2018.01)
*G06F 8/34* (2018.01)

(52) U.S. Cl.
CPC . *G06F 8/38* (2013.01); *G06F 8/34* (2013.01)

(58) Field of Classification Search
CPC ........... G06F 8/34; G06F 8/38; G06F 9/44505
See application file for complete search history.

(56) References Cited

U.S. PATENT DOCUMENTS

| | | | | |
|---|---|---|---|---|
| 9,959,198 B1* | 5/2018 | Jha | ...................... | G06F 11/3664 |
| 10,048,942 B2* | 8/2018 | Nucci | ...................... | G06F 8/20 |
| 10,592,068 B1* | 3/2020 | Sedky | ................ | G06F 3/04842 |
| 10,747,390 B1* | 8/2020 | Ranabahu | ........... | G06F 3/04817 |
| 10,831,453 B2* | 11/2020 | Alurralde Iturri | ........ | G06F 8/35 |
| 2007/0239818 A1* | 10/2007 | Liou | ...................... | G06F 16/275 709/201 |
| 2010/0042868 A1* | 2/2010 | Apelbaum | .......... | G06F 11/1482 714/2 |
| 2011/0209162 A1* | 8/2011 | Machiraju | ................. | G06F 8/20 719/328 |
| 2013/0275475 A1* | 10/2013 | Ahlborn | ............. | G06Q 10/0633 707/812 |
| 2013/0332899 A1* | 12/2013 | Stewart | ............... | G06F 9/44505 717/121 |
| 2018/0081642 A1* | 3/2018 | Alurralde Iturri | ........ | G06F 8/36 |
| 2019/0158594 A1* | 5/2019 | Shadmon | ................ | H04L 67/01 |

* cited by examiner

*Primary Examiner* — Kenny Nguyen
(74) *Attorney, Agent, or Firm* — Prol Intellectual Property Law, PLLC; H. Kenneth Prol

(57) ABSTRACT

A method for tailoring a visual element customizer to a domain-specific language (DSL) may comprise executing custom-scripted code instructions for a visual element customizer to associate an action and an operation with a subset of custom-DSL code instructions for performing the action within an executable operation, and receiving, via a first graphical user interface (GUI), an administrator instruction to generate a second GUI that points a business user to select at least one action and an operation with the visual element customizer. The method may also include receiving selections of visual elements representing an integration process and a user instruction to customize one of the selected visual elements to perform the action, and the operation under a custom DSL, and transmitting an executable run-time engine and the subset of custom-DSL code instructions for execution of the integration process at a remote location.

20 Claims, 9 Drawing Sheets

SYSTEM AND METHOD FOR TAILORING A CUSTOMIZER FOR INTEGRATION PROCESS MODELING VISUAL ELEMENT TO A DOMAIN SPECIFIC LANGUAGE FOR BUSINESS INTEGRATIONS

FIELD OF THE DISCLOSURE

The present disclosure relates generally to a system and method for deploying and executing customized data integration processes. More specifically, the present disclosure relates to customizing visual elements representing steps of a data integration process for use with customized domain-specific languages.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities and require communication among a variety of data formats.

BRIEF DESCRIPTION OF THE DRAWINGS

The present disclosure will now be described by way of example with reference to the following drawings in which.

The use of the same reference symbols in different drawings may indicate similar or identical items.

DETAILED DESCRIPTION

Figure 1:
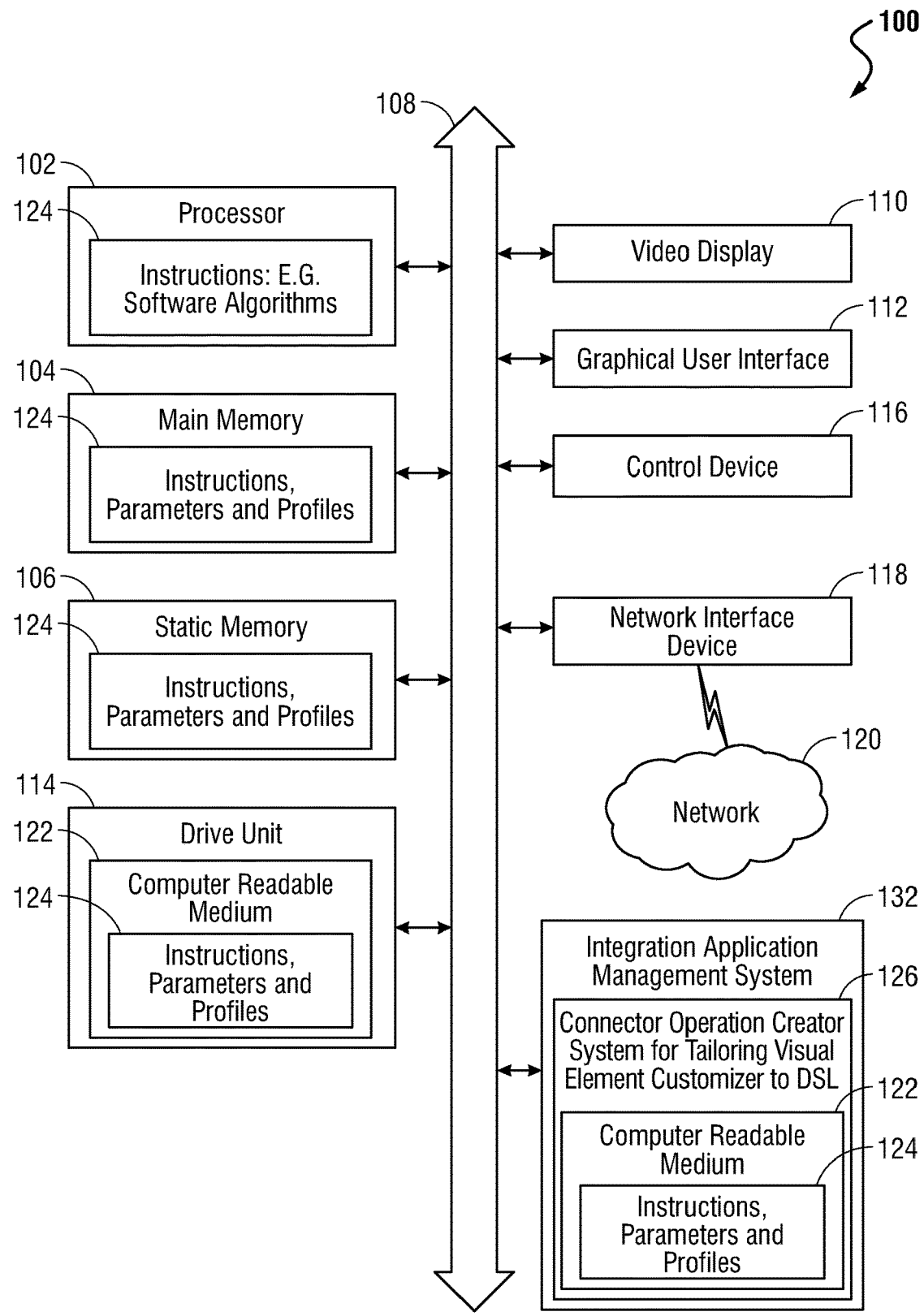
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Current methods of transacting business between or among a plurality of business entities involve the use of multiple software applications, application programming interfaces (APIs), or integration processes to transfer shared data among the plurality of businesses. Each of these business entities may use a different structure or method for receiving and storing the same type of information, causing each of these multiple applications, APIs, or integration processes to be customized to a particular business or group of businesses among which the same data may be shared. Embodiments of the present disclosure allow businesses to perform such necessary customization using an integration process modeling graphical user interface (GUI) that allows a user to model each step of the data sharing among the various businesses, using visual icons representing units of work to be performed within the integration process. An integration application management system managing such an integration process modeling GUI in embodiments described herein may generate the modeled integration process code instructions for performing this necessary customization of an integration process for a particular user's needs, and transmit these modeled integration process code instructions, along with a runtime engine for remote execution of those modeled integration process code instructions at another location, for example, within an enterprise user's network, or in a cloud computing environment. In such a way, users may customize integration processes using these visual elements, without having to learn the underlying computer language that will execute these steps.

Once a user has chosen what she wants an executable code instruction to achieve using the integration process modeling GUI in embodiments described herein, the modeled integration process code instructions capable of achieving such a task may be generated. Modeled integration process code instructions for achieving a task can be written in any number of languages and/or adhere to any number of standards, often requiring a code writer to have extensive knowledge of computer science and languages. The advent of open-standard formats for writing code instructions that are both human-readable and machine executable have made the writing of code instructions accessible to individuals that do not have high-level knowledge of computer science. Such open-standard, human-readable, machine-executable file formats include extensible markup language (XML) and JavaScript Object Notification (JSON).

In addition to the advent of open-standard, human-readable, machine-executable code instructions, the advent of APIs designed using such open-standard code instructions have also streamlined the methods of communication between various software components. In embodiments herein, the open-standard modeled integration process code instructions or a specification for an API involved in a business integration process may be accessed and analyzed or parsed in order to understand the ways in which systems outside the API may access data controlled by the API. An API may provide specifications for the ways in which routines, data structures, object classes, variables, or remote calls may be invoked and/or handled during business integration processes. APIs may execute code instructions written in any number of open-source computing languages. For example, integration systems modeled by a user of the integration process modeling GUI in embodiments may include steps for communicating with an API adhering to the open-source Swagger™ standard. The Swagger™ standard defines a specific syntax for identifying data locations, a list of available actions that can be taken on data, and a syntax for identifying specific datasets managed by a Swagger™ API. Further, the Swagger standard can be used to write customized domain-specific languages. For example, Dell® Boomi® has developed a Swagger®-compliant DSL for sending and receiving data as a subprocess within a business integration process. This is only one example of a custom domain-specific language (DSL). Other custom DSLs in embodiments may provide different syntaxes for identifying datasets/locations, and a different list of available actions than those provided by the Swagger™ standard. For example, Java® Database Connectivity (JDBC) DSL may be a structured query language (SQL) or another SQL may be implemented with its own identifying datasets/locations and its own list of available actions. Further, a DSL may be used for hypertext transfer protocol (HTTP) having yet another set of identifying datasets/locations and its own list of available actions. Each custom DSL may be associated with a DSL specification which is publicly available and provides these various syntax requirements and available actions.

Such API specifications in embodiments may be parsed in order to determine each of the ways in which datasets can be defined or manipulated via an API, and to determine the code instruction syntax for achieving such a manipulation. This may result in generation of lists of actions such an API allows integration processes to perform, and naming conventions for the datasets upon which such actions may be performed. Existing systems use such a list (e.g., a list of actions available based on the Swagger™ standard, based on the JDBC standard, based on the HTTP standard, or others) to create a visual element customizer GUI to interface with a visual element customizer that allows a business user to choose an action to take on a dataset, without the business user having to understand the underlying modeled integration process code instructions for achieving this task. Such a visual element customizer GUI may be particularly useful to business users within the enterprise system/network that are not necessarily well-versed in the computer language in which the modeled integration process code instructions are written for the API being accessed via the integration process.

A business integration process, or a portion thereof involving accessing an API may be modeled simply by choosing an action to be taken on a specific dataset from each of these respective lists. In embodiments herein, a user interface may be generated for allowing a user, such as a business user at an enterprise customer, to choose from a list of available actions, and a list of available datasets in order to model the behavior of a custom connector element within a visual flow diagram of a business integration process. A user may add a connector element to a visual flow diagram, indicating she wishes to access and/or manipulate data via an API, which may prompt display of a visual element customizer GUI to interface with a visual element customizer to customize the function and settings of the visual element. The visual element customizer GUI in embodiments described herein may then prompt the user to select an available action, and an available operation employing that action. Such an operation may also define the dataset upon which the action will be performed. In doing so, the user may define a business integration process involving performing the chosen action on the dataset defined by the chosen operation. In order to execute such a business integration process, the subsets of modeled integration process code instructions associated with each of the chosen action and operation may be automatically located within memory, and combined to form a custom connector code set for execution by a run-time engine. In such a way, the user may design the business integration process involving accessing data via the API by choosing from a list of available actions, operations, or datasets within the visual element customizer GUI, without having to write, read, or access any code instructions.

The APIs accessed according to models generated using such prior systems may operate according to widely used, general purpose programming languages. For example, an API accessed during a modeled integration process in such existing systems may execute modeled integration process code instructions written in the Java® programming language. Such general purpose programming languages can be used to write executable modeled integration process code instructions for solving any number of problems encountered by any number of customers, industries, or technology types. For example, Java® may be used to write modeled integration process code instructions for operating an online marketplace, to develop an electronic or video game, build websites, or develop APIs for any number of specific uses. In contrast, an increasing number of APIs or applications may be written in domain-specific languages (DSLs) designed to solve problems specific to an individual customer, industry, or technology type. For example, the Swagger™ DSL may be used to build APIs, while the Atlassian™ Era™ DSL may be used to plan and track issues a team of individuals must address or solve in order to reach a common goal. Such a common goal may range in topics, and may include, for example, building a product for a customer, building a software tool, executing a business merger, or design, testing, and manufacture of a part or medicine. Java® Database Connectivity (JDBC) DSL may be a structured query language (SQL) used to access data stored in a database. Another DSL may be a DSL for HTTP that may be used to access data stored via web browser or webservers. Other example DSL are also contemplated beyond these few examples. Each of these custom DSLs may include separate specifications, each defining a separate list of actions a single DSL may take and differing syntaxes used to identify datasets upon which such actions can be taken.

Modeling an integration system using the connector visual elements in prior systems provided value to a non-technical business user, in part because the connector visual elements allowed the user to choose from a preset list of known available actions and datasets. This alleviated the need for the non-technical business user to learn each of these available actions and datasets. Thus, existing systems that allowed a business user to customize a connector visual element for interfacing with an API complying with the Swagger™ standard may allow the business user to choose from the list of actions defined within the Swagger™ standard, open source specification. As the use of customized DSLs, each using their own available actions and datasets proliferates, demand among enterprise users of the integration process modeling GUI for visual elements customized to these specific DSLs also increases. In other words, there is a need for connector visual elements that allow a non-technical business user to choose from a preset list of known available actions and datasets specific to that user's needs, as defined by the custom DSL the enterprise uses.

Many custom DSLs are developed in-house, or within a specific enterprise, business, industry, or technical area. This allows the individual enterprise, business, industry, or technical area to develop a DSL that tightly fits the specific problem the software program written using that DSL is designed to solve. However, this results in hundreds, thousands, or more individual DSLs, each with separate ways of describing actions, operations, and data. Further, the individuals familiar with the syntaxes and actions available for these DSLs may be technical users or enterprise administrators employed within the enterprise or business in which the DSLs were built in-house. Thus, in order for the service provider of the integration process modeling GUI to generate a connector visual element customized to a specific DSL, an employee of the service provider must become proficient in the custom DSL. Because of the ever-growing volume of custom DSLs, this may result in employees of the integration process modeling GUI constantly learning new DSLs that are already understood by employees of various customers of the service provider. A more efficient method is needed that allows the technical users or enterprise administrators within the enterprise or businesses who is already proficient in the custom DSL to customize the connector visual element to that custom DSL themselves.

Embodiments of the present disclosure address this issue by allowing technical users or administrators within an enterprise system that also uses the integration process modeling GUI to customize connector visual elements compatible with custom DSLs, or combinations thereof. In embodiments, a technical user or enterprise administrator may transmit custom-scripted code instructions that identify actions the custom DSL may be capable of taking, and objects upon which those actions may be taken to the connector operation creator system for tailoring a visual element customizer to a DSL. Such custom-scripted code instructions may also associate subsets of code instructions, written in a custom DSL, with those identified actions and objects. These subsets of code instructions, written in a custom DSL, may be referred to herein as custom DSL code instruction sub sets.

In some embodiments, the custom-scripted code instructions may be written in a first programming language, and the custom DSL code instruction subsets may be written in a second language. The custom DSL code instruction subsets in an embodiment may be written in a first DSL designed to execute a specific process desired by the business user when selecting a custom connector visual element. For example, the custom DSL code instruction subsets of the connector process associated with the connector visual element may be written in the JDBC DSL, which is designed to access data stored at a SQL database. This may be necessary in order to allow a business user to customize a visual element to execute an integration process for accessing such data at a SQL database, implementing the type of DSL selected by the enterprise. In another embodiment for example, the custom DSL code instruction subsets of the connector process associated with the connector visual element may be written in the HTTP DSL, which is designed to access data stored at a web server databases accessible via web browsers. This may be necessary in order to allow a business user to customize a visual element to execute an integration process for accessing such data at a web server database, implementing the type of DSL selected by the enterprise. Other example DSLs are contemplated. However, the technical user providing functionality to a business user to customize the selected custom connector visual element via a visual element customizer GUI may be most proficient or most comfortable writing code instructions for the visual element customizer GUI used to interface with the visual element customizer in another custom DSL (e.g., Swagger™) or a general purpose computing language (e.g., Java®). Embodiments of the present disclosure allow such a technical user to write the custom-scripted code instructions in this other language (e.g., Swagger™, or Java®) to set up the operation of the visual element customizer and visual element customizer GUI, although the custom-scripted code instructions ultimately operate to tailor the visual element customizer GUI to display actions and operations compliant with a different custom DSL (e.g., JDBC, HTTP, Swagger, Jira, or other) that is the DSL of the enterprise. In such a way, embodiments of the present disclosure allow technical users to tailor a visual element customizer and visual element customizer GUI to be compliant with any custom DSL of an enterprise by providing code instructions written in the computing language with which the technical user or administrator is most comfortable or proficient.

A technical user or administrator may then use a connector operation creator system GUI to define a custom operation adherent to the DSL. Such a custom operation may include an action available within the DSL, and an object upon which such an action may be taken. The technical user or administrator may choose from a list of actions available in accordance with the custom DSL via a connector operation creator system GUI. The object upon which such an action may be taken may be defined by the technical user or administrator in embodiments by accessing an import wizard. Via this import wizard, the technical user or administrator may identify the custom-scripted code instructions that identify actions the custom DSL may be capable of taking, and objects upon which those actions may be taken, as described directly above. The connector operation creator system for tailoring a visual element customizer to a DSL may access the identified custom-scripted code instructions developed in any code language or DSL and parse them to identify one or more objects defined within the custom-scripted code instructions, and the custom DSL code instruction subsets associated with these one or more objects within the custom-scripted code instructions. Each of the objects identified within the parsed custom-scripted code instructions in such a way may then be displayed for selection by the technical user or administrator within the import wizard in embodiments. Using this import wizard and the connector operation creator system GUI, a visual element customizer for a custom connector visual element may be modified to accommodate the custom DSL for an enterprise.

Upon selection of one of these displayed objects, the connector operation creator system for tailoring a visual element customizer to a DSL may reference the specification for the DSL identified within the custom-scripted code instruction to determine the proper syntax for invoking the technical user-selected action within the connector operation creator system GUI. The connector operation creator system for tailoring a visual element customizer to a DSL may also retrieve the custom DSL code instruction subset associated with the object selected by the technical user within the import wizard. The properly formatted invocation of the user-selected action may then be combined with the custom DSL code instruction subset associated with the user-selected object to create a custom connector operation code instruction. This custom connector operation code instruction may be stored at a location available to the integration application management system and associated with a process label set by the technical user.

At this point, the custom connector operation within the custom DSL may become available for selection by a business user for incorporation within a modeled integration process when setting up visual elements of a custom connector with the tailored visual element customizer GUI. For example, a business user may model an integration process via the integration process modeling GUI of an integration application management system and select a custom connector visual element. This visual element selection may automatically open a visual element customizer GUI to allow actions performed by the connector process of the custom connector to be defined or settings to be entered via the visual element customizer system. The business user may select a custom connector type defining the custom DSL in which the code instructions for executing the step illustrated by the custom connector visual element will be written.

Based on the chosen connector type, the visual element customizer GUI may then display all actions available according to the specification for that custom DSL that may define the custom connector process associated with the selected custom connector type. The business user may select one or more actions via the visual element customizer GUI. The business user may then choose from a list of custom connector operations associated with the action chosen by the business user via the visual element customizer GUI to further define the custom connector process. As described above, the technical user or enterprise administrator may have defined one or more such custom connector operations using the connector operation creator system GUI and import wizards to define these actions from the custom DSL. Further, the custom connector operation code instruction associated with that custom connector operation may be stored at a location available to the integration application management system. Thus, upon selection by the business user of the custom connector operation defined by the technical user, the integration application management system in embodiments may associate the custom connector visual element placed into the integration system by the business manager with the custom connector operation code instructions, written in the custom DSL. In such a way, a technical user proficient in a custom DSL may allow a business user to choose from actions supported by the custom DSL, and operations incorporating these available actions to perform on datasets identified by the technical user. This may obviate the need for the business user or an employee of the integration application management system service provider to learn the underlying syntaxes and coding language of each custom DSL. In this way, a customer enterprise technical user or administrator can define the types of actions and operations to be made available to a business user via the visual element customizer within the custom DSL of the enterprise for modeling business integration processes.

FIG. 1 is a block diagram illustrating an information handling system, according to an embodiment of the present disclosure. Information handling system 100 can include processing resources for executing machine-executable code, such as a central processing unit (CPU), a programmable logic array (PLA), an embedded device such as a System-on-a-Chip (SoC), or other control logic hardware used in an information handling system several examples of which are described herein. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules herein, and operates to perform one or more of the methods. The information handling system 100 may execute code 124 for the connector operation creator system for tailoring a visual element customizer to a DSL 126, or the integration application management system 132 that may operate on servers or systems, remote data centers, or on-box in individual client information handling systems such as a local display device, or a remote display device, according to various embodiments herein. In some embodiments, it is understood any or all portions of code 124 for the connector operation creator system for tailoring a visual element customizer to a DSL 126, or the integration application management system 132 may operate on a plurality of information handling systems 100.

The information handling system 100 may include a processor 102 such as a central processing unit (CPU), a graphics-processing unit (GPU), control logic or some combination of the same. Any of the processing resources may operate to execute code that is either firmware or software code. Moreover, the information handling system 100 can include memory such as main memory 104, static memory 106, drive unit 114, or the computer readable medium 122 of the connector operation creator system for tailoring a visual element customizer to a DSL 126, or the integration application management system 132 (volatile (e.g. random-access memory, etc.), nonvolatile (read-only memory, flash memory etc.) or any combination thereof). Additional components of the information handling system can include one or more storage devices such as static memory 106, drive unit 114, and the computer readable medium 122 of the connector operation creator system for tailoring a visual element customizer to a DSL 126, or the integration application management system 132. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110, such as a liquid crystal display (LCD), an organic light emitting diode (OLED), a flat panel display, a solid state display, or other display device. Additionally, the information handling system 100 may include a control device 116, such as an alpha numeric control device, a keyboard, a mouse, touchpad, camera, fingerprint scanner, retinal scanner, face recognition device, voice recognition device, or gesture or touch screen input.

The information handling system 100 may further include a graphical user interface 112. The graphical user interface (GUI) 112 in an embodiment may provide a visual designer environment for the integration application management system 132 permitting a user to define process flows between applications/systems, such as between trading partner and enterprise systems, and to model a customized business integration process. The graphical user interface 112 in an embodiment may provide a menu of pre-defined user-selectable visual elements and permit the user to arrange them as appropriate to model a process and may be displayed on the video display 110. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc.

Further, the graphical user interface 112 allows the user to provide user input providing information relating to trading partners, activities, enterprise applications, enterprise system attributes, and/or process attributes that are unique to a specific enterprise end-to-end business integration process. For example, the graphical user interface 112 may provide drop down or other user-selectable menu options for identifying trading partners, application connector and process attributes/parameters/settings, etc., and dialog boxes permitting textual entries by the user, such as to describe the format and layout of a particular dataset to be sent or received, for example, a Purchase Order. A user of the graphical user interface 112 in an embodiment may model multiple business integration processes, including children integration processes that are preset to execute upon the execution of a parent integration process or a subprocess thereof.

Graphical user interface 112 may also provide for an interface to a visual element customizer according to embodiments herein to provide for a user to customize particular connector processes or other business integration process elements to perform actions, operations, select objects, or define parameters or settings for one or more selected visual elements during modeling of a business integration process. This may be referred to as a visual element customizer GUI. Further, graphical user interface 112 according to embodiments herein may provide for a connector operation creator system GUI and one or more input wizards to provide for a technical user or an enterprise administrator to tailor a visual element customizer to enable a business user to select actions, operations, objects or set parameters and the like for a custom visual element within a DSL used by an enterprise.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 114, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive unit 114 or in a storage system (not illustrated) associated with network interface device 118 or any combination thereof. Application programs 124, and BIOS/FW code 124 can each be implemented as single programs, or as separate programs carrying out the various features as described herein. Application program interfaces (APIs) such as WinAPIs (e.g. Win32, Win32s, Win64, and WinCE), proprietary APIs (e.g., for SalesForce® or Oracle's® NetSuite), or an API adhering to a known open source specification (e.g., Swagger™) may enable application programs 124 to interact or integrate operations with one another.

In an example of the present disclosure, instructions 124 may execute software for allowing a technical user of an enterprise system that is proficient in a DSL to tailor a visual element customizer via a visual element customizer graphical user interface 112 for customizing a visual element for modeling an integration process task to comply with the syntax and operation of that DSL. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The disk drive unit 114, and the connector operation creator system for tailoring a visual element customizer to a DSL 126, or the integration application management system 132 may include a computer-readable medium 122 such as a magnetic disk, or a solid-state disk in an example embodiment. The computer-readable medium of the memory 104, storage devices 106 and 114, the connector operation creator system for tailoring a visual element customizer to a DSL 126, or the integration application management system 132 may store one or more sets of instructions 124, such as software code corresponding to the present disclosure.

The disk drive unit 114, static memory 106, and computer readable medium 122 of the connector operation creator system for tailoring a visual element customizer to a DSL 126, or the integration application management system 132 also contain space for data storage such as execution logs containing metadata describing previous executions of parent and child integration processes. Connector code sets, and trading partner code sets may also be stored in part in the disk drive unit 114, static memory 106, or computer readable medium 122 of the connector operation creator system for tailoring a visual element customizer to a DSL 126, or the integration application management system 132 in an embodiment. In other embodiments, data profile code sets, and run-time engines may also be stored in part or in full in the disk drive unit 114, static memory 106, or computer readable medium 122 of the connector operation creator system for tailoring a visual element customizer to a DSL 126, or the integration application management system 132. Further, the instructions 124 of the connector operation creator system for tailoring a visual element customizer to a DSL 126, or the integration application management system 132 may embody one or more of the methods or logic as described herein.

In a particular embodiment, the instructions, parameters, and profiles 124, and the connector operation creator system for tailoring a visual element customizer to a DSL 126, or the integration application management system 132 may reside completely, or at least partially, within the main memory 104, the static memory 106, disk drive 114, and/or within the processor 102 during execution by the information handling system 100. Software applications may be stored in static memory 106, disk drive 114, the connector operation creator system for tailoring a visual element customizer to a DSL 126, or the integration application management system 132.

Network interface device 118 represents a NIC disposed within information handling system 100, on a main circuit board of the information handling system, integrated onto another component such as processor 102, in another suitable location, or a combination thereof. The network interface device 118 can include another information handling system, a data storage system, another network, a grid management system, another suitable resource, or a combination thereof, and may communicate via a wired connection or wirelessly.

The connector operation creator system for tailoring a visual element customizer to a DSL 126, or the integration application management system 132 may also contain computer readable medium 122. While the computer-readable medium 122 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the connector operation creator system for tailoring a visual element customizer to a DSL 126, or the integration application management system 132, which may be operably connected to the bus 108. The connector operation creator system for tailoring a visual element customizer to a DSL 126 is discussed in greater detail herein below.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, or module can include software, including firmware embedded at a device, such as an Intel® Core class processor, ARM® brand processors, Qualcomm® Snapdragon processors, or other processors and chipset, or other such device, or software capable of operating a relevant environment of the information handling system. The system, device or module can also include a combination of the foregoing examples of hardware or software. In an example embodiment, the connector operation creator system for tailoring a visual element customizer to a DSL 126, or the integration application management system 132 and the several modules described in the present disclosure may be embodied as hardware, software, firmware or some combination of the same. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
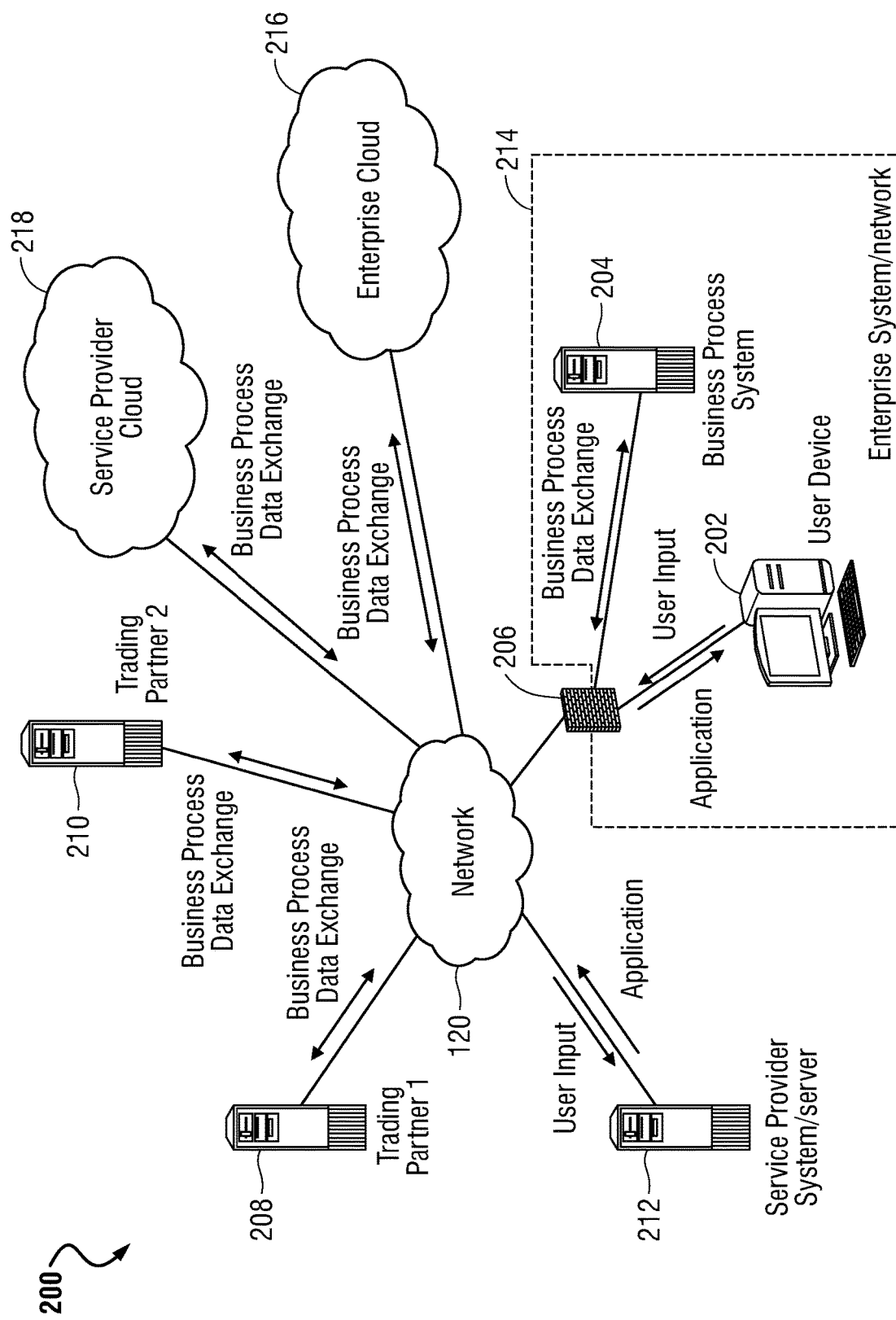
FIG. 2 is a block diagram illustrating a simplified integration network according to an embodiment of the present disclosure.

FIG. 2 is a block diagram illustrating a simplified integration network 200 including a service provider system/server 212 and an enterprise system/network 214 in an embodiment according to the present disclosure. Actual integration network topology could be more complex in some other embodiments. As shown in FIG. 2, an embodiment may include conventional computing hardware of a type typically found in client/server computing environments. More specifically, the integration network 200 in an embodiment may include a conventional user/client device 202, such as a conventional desktop or laptop PC, enabling a user to communicate via the network 120, such as the Internet. In another aspect of an embodiment, the user device 202 may include a portable computing device, such as a computing tablet, or a smart phone. The user device 202 in an embodiment may be configured with conventional web browser software, such as Google Chrome®, Firefox®, or Microsoft Corporation's Internet Explorer® for interacting with websites via the network 120. In an embodiment, the user device 202 may be positioned within an enterprise network 214 behind the enterprise network's firewall 206, which may be of a conventional type. As a further aspect of an embodiment, the enterprise network 214 may include a business process system 204, which may include conventional computer hardware and commercially available business process software such as QuickBooks, Oracle's OneWorld JD Edward ERP, Infor's WMS Application, or many other types of databases.

In an embodiment, the integration network 200 may further include trading partners 208 and 210 operating conventional hardware and software for receiving and/or transmitting data relating to business-to-business transactions. For example, Walmart® may operate trading partner system 208 to allow for issuance of purchase orders to suppliers, such as the enterprise 214, and to receive invoices from suppliers, such as the enterprise 214, in electronic data form as part of electronic data exchange processes. Electronic data exchange process in an embodiment may include data exchange via the world wide web. In other embodiments, electronic data exchange processes may include data exchange via File Transfer Protocol (FTP) or Secure File Transfer Protocol (SFTP).

As yet another example embodiment, trading partner system 208 may allow for access and manipulation of data according to an application interface platform (API) adhering to an open source domain-specific language (DSL). Specifications for such open source DSLs defines a specific syntax for identifying data locations, a list of available actions that can be taken on data, and a syntax for identifying specific datasets. This preset definition of syntaxes allows for easy identification of subsets of modeled integration process code instructions with specific data locations, actions, and datasets available with the DSL. As such, modeled integration process code instructions written in accordance with such open-source specifications become much easier to parse.

In an embodiment, a provider of a service ("service provider") for creating on-demand, real-time creation of customized data integration software applications may operate a service provider server/system 212 within the integration network 200. The service provider system/server 212 may be specially configured in an embodiment, and may be capable of communicating with devices in the enterprise network 214. The service provider system/server 212 in an embodiment may host an integration process-modeling user interface in an embodiment. Such an integration process-modeling user interface may allow a user to model an integration process including one or more sub-processes for data integration through a business process data exchange between an enterprise system/network 214 and outside entities. The integration process modeled in the integration process-modeling user interface in an embodiment may be a single business process data exchange shown in FIG. 2, or may include several business process data exchanges shown in FIG. 2. For example, the enterprise system/network 214 may be involved in a business process data exchange via network 120 with a trading partner 1, and/or a trading partner 2. In other example embodiments, the enterprise system/network 214 may be involved in a business process data exchange via network 120 with a service provider located in the cloud 218, and/or an enterprise cloud location 216.

The user of an integration process-modeling user interface in an embodiment may model one or more business process data exchanges via network 120 within an integration process by adding one or more connector integration elements to an integration process flow diagram. These connector integration elements in an embodiment may model the ways in which a user wishes data to be accessed, moved, and/or manipulated during the one or more business process data exchanges. Each connector element the user adds to the integration process flow diagram in an embodiment may be associated with a pre-defined subset of modeled integration process code instructions stored at the service provider systems/server 212 in an embodiment. Upon the user modeling the integration process, the service provide system/server 212 in an embodiment may generate a run-time engine capable of executing the pre-defined subsets of modeled integration process code instructions represented by the connector integration elements chosen by the user. The runtime engine may then execute the subsets of modeled integration process code instructions in the order defined by the modeled flow of the connector integration elements given in the integration process flow diagram. In such a way, an integration process may be executed without the user having to access, read, or write the code instructions of such an integration process.

Modeling an integration system using the connector visual elements in such a way provides value to a non-technical business user, in part, because the connector visual elements allow the user to choose from a preset list of known available actions and datasets. This alleviates the need for the non-technical business user to learn each of these available actions and datasets. As the use of customized DSLs proliferates, each using their own available actions and datasets, the demand among enterprise users (e.g., 214) of the integration process modeling GUI hosted by the service provider server system 212 for visual elements customized to these specific DSLs also increases. In other words, connector visual elements must allow a non-technical business user to choose from a preset list of known available actions and datasets specific to that user's needs, but also as defined by the custom DSL that the enterprise uses.

Many custom DSLs are developed in-house, or within a specific enterprise (e.g., 214), business, industry, or technical area. This allows the individual enterprise (e.g., 214), business, industry, or technical area to develop a DSL that tightly fits the specific problem the software program written using that DSL is designed to solve. However, this results in hundreds, thousands, or more individual DSLs, each with separate ways of describing actions, operations, and data. Further, the individuals familiar with the syntaxes and actions available for these DSLs may be employed within the enterprise (e.g., 214) or business in which the DSLs were built in-house. Thus, in order for the service provider 212 of the integration process modeling GUI within an integration application management system to generate a connector visual element customized to a specific DSL, an employee of the service provider 212 would need to become proficient in the custom DSL. Because of the ever-growing volume of custom DSLs, this may result in employees of the service provider 212 constantly learning new DSLs that are already understood by employees of various customers (e.g., 214) of the service provider 212 causing unnecessary burden and potential delay. A more efficient method would allow the technical user or enterprise administrator within the enterprise (e.g., 214) or businesses who is already proficient in the custom DSL to be able to customize the connector visual element customizer tool to operate in accordance with the custom DSL themselves, as opposed to employees of the integration application management system service provider 212.

Embodiments of the present disclosure address this issue by allowing technical users or administrators within an enterprise system (e.g., 214) that also uses the integration process modeling GUI to customize connector visual elements compatible with any custom DSL, or combinations thereof and prepare a tailored visual element customizer tool to allow business users to utilize the custom connectors in business integration modeling. Once such a technical user or administrator has tailored a connector visual element to be compatible with a custom DSL in such a way, a business user of the integration process modeling GUI hosted at the service provider 212 may insert these DSL-customized connector visual elements into an integration process flow modeled by the business user via the integration process modeling GUI. Upon such an insertion, the business user may then be prompted to choose from a list of known actions or operations supported by that specific custom DSL, and a list of known operations defining known datasets upon which such an action will be taken via the tailored visual element customizer GUI. In such a way, a technical user proficient in a custom DSL may limit the available actions the business user may choose to only those actions supported by the custom DSL, obviating the need for the business user or an employee of the service provider 212 to learn the underlying syntaxes and coding language of the custom DSL.

Figure 3:
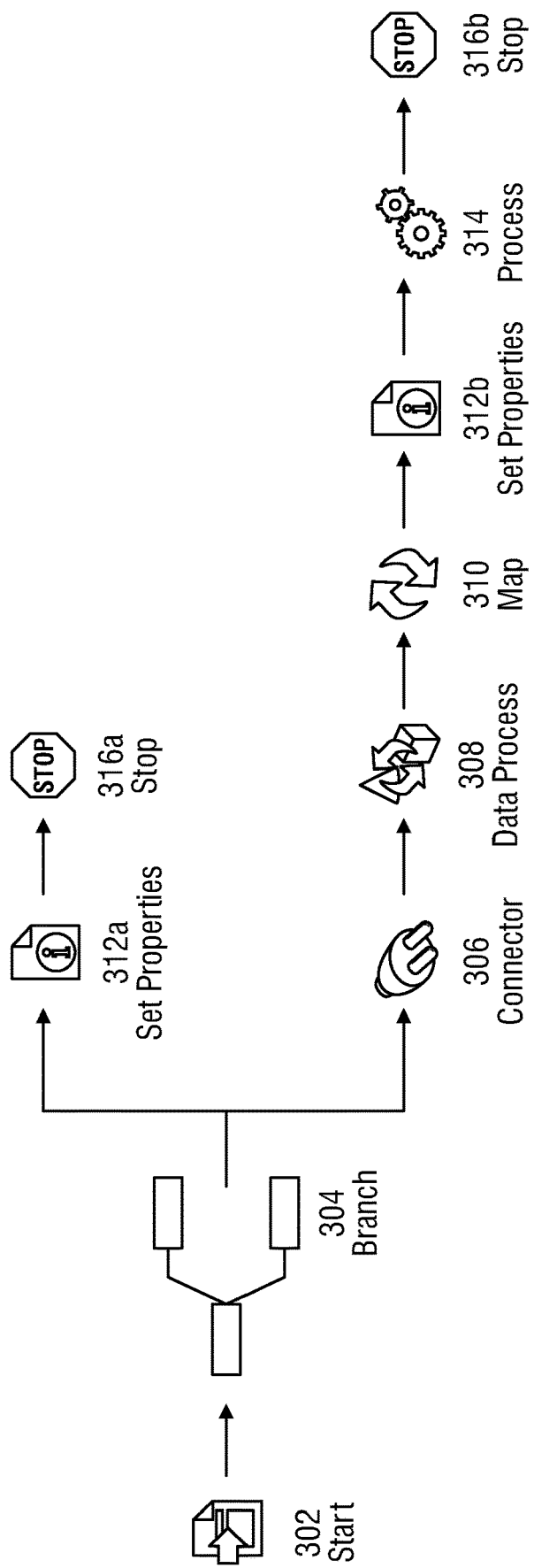
FIG. 3 is a block diagram illustrating a user-generated flow diagram of an integration process according to an embodiment of the present disclosure.

FIG. 3 is a block diagram illustrating a user-generated flow diagram of an integration process for exchange of electronic data records according to an embodiment of the present disclosure. A user may generate a flow diagram in an embodiment by providing a chronology of process-representing integration elements via the use of an integration process-modeling graphical user interface (GUI). In an embodiment, the user-selectable elements representing integration sub-processes (e.g. connector integration elements) may be visual icons.

An integration process-modeling user interface in an embodiment may provide a design environment permitting a user to define process flows between applications/systems, such as between trading partner and enterprise systems, and between on-site data centers and cloud-based storage modules, and to model a customized business integration process. Such an integration process-modeling user interface in an embodiment may provide a menu of pre-defined user-selectable elements representing integration sub-processes and permit the user to arrange them as appropriate to model a full integration process. For example, in an embodiment, the elements may include visual, drag-and-drop icons representing specific units of work (known as process components) required as part of the integration process. Such a process component in an embodiment may include invoking an application-specific connector to access, and/or manipulate data. In other embodiments, process components may include tasks relating to transforming data from one format to another, routing data down multiple paths of execution by examining the contents of the data, business logic validation of the data being processed, etc.

As shown in FIG. 3, such process-representing visual elements may include a start element 302, a connector element 306, and stop elements 316a and 316b. Other embodiments may also include a branch element 304, a data process element 308, a process call element 314, set properties elements 312a and 312b, and a map element 310. A connector element 306, and a start element 302 in an embodiment may represent a subprocess of an integration process describing the accessing and/or manipulation of data via an API for example.

In an embodiment, a start element 302 may operate to begin a process flow, and a stop element 316a and stop element 316b may operate to end a process flow. As discussed above, each visual element may require user input in order for a particular enterprise or trading partner to use the resulting process. The start element 302 in an embodiment may further allow or require the user to provide data attributes unique to the user's specific integration process, such as, for example, the source of incoming data to be integrated. Such user input options may be presented to a user with a visual element customizer GUI according to some embodiments. The start element 302 in an embodiment may also operate as a connector element. The user may identify the source of incoming data to be integrated in some embodiments via a visual element customizer GUI, as described herein.

In an embodiment, a connector element 306 may operate connector process to enable communication with various applications or data sources between which the user wishes to exchange data. The connector element 306 in an embodiment may further allow or require the user to provide data attributes unique to the user's specific integration process. For example, each connector element 306, when chosen and added to the process flow in the integration process-modeling user interface, may allow a user to choose from different actions the connector element 306 may be capable of taking on the data as it enters that connector process step. Further the integration-process modeling user interface in an embodiment may allow the user to choose the dataset upon which the action will be taken. The action and dataset may be selected by the user via a separate user interface called a visual element customizer GUI in some embodiments, as described herein.

The action and dataset the user chooses may be associated with a connector code set, which may be pre-defined and stored at a system provider's memory in an embodiment. The system provider server/system in an embodiment may generate a dynamic runtime engine for executing these pre-defined subsets of modeled integration process code instructions correlated to each individual process-representing visual element (process component) in a given flow diagram in the order in which they are modeled in the given flow diagram.

As described herein, existing systems allow users to choose the action and object of that action via the visual element customizer GUI, for general-purpose computing languages or for DSLs such as Swagger™, Java® Database Connectivity (JDBC), HTTP, or the like. Embodiments of the present disclosure allow technical employees within the enterprise or business who are proficient in other custom DSLs to reformat the visual element customizer tool and its visual element customizer GUI to display actions and objects recognizable within these other custom DSLs. For example, the visual element customizer GUI may be reformatted in an embodiment to allow a business user to choose actions and objects from a list of actions or objects compliant with a custom DSL written to achieve a specific task that is unique to the enterprise's needs. As described herein, one such example custom DSL may be the JDBC DSL that is used to access data stored at a SQL database. A visual element customizer GUI tailored for use with the JDBC DSL in an embodiment may allow a business user to model a process for accessing and querying such information, without having to learn the JDBC DSL syntax or structure. As described herein, another such example custom DSL may be the HTTP DSL that is used to access data stored at a web server database. A visual element customizer GUI tailored for use with the HTTP DSL in an embodiment may allow a business user to model a process for accessing and querying such information, without having to learn the HTTP DSL syntax or structure. As also described herein, the actions and operations or objects listed within the visual element customizer GUI in embodiments may represent underlying code instructions written in the custom DSL (e.g., JDBC, HTTP, or other). Because these actions and objects or operations may form representations of the underlying code instructions, but do not comprise code instructions themselves, these actions, operations, or objects displayed within the visual element customizer GUI for selection by a business user may be referred to herein as action labels, operation labels, or object labels.

In embodiments, a technical user may transmit custom-scripted code instructions that label actions the custom DSL may be capable of taking, and objects upon which those actions may be taken to the connector operation creator system for tailoring a visual element customizer to a DSL. In other words, the custom-scripted code instructions may define the action labels, operation labels, or object labels displayed within the visual element customizer GUI for selection by a business user. Such custom-scripted code instructions may also associate subsets of code instructions, written in a custom DSL, with those identified action labels, operation labels, or object labels. These subsets of code instructions, written in a custom DSL, may be referred to herein as custom DSL code instruction subsets.

For example, a technical user may use a text editor to write and compile the following custom-scripted code instructions:

```
1   jdbcConnector {
2       //define connection url (postgres sample)
3       jdbcUrl "jdbc:postgresql:database"
4
5       // define available operations
6       operations {
7           // define a process pending operation that selects all approved accounts and
8           inserts them into a vendor table
9           "Process Pending Requests" {
10              // 1st step is select from 2 tables
11              SELECT {
12                  // define the columns to select
13                  projection {
14                      a.account_id,
```

-continued

```
15                    a.account_name,
16                    p.approval_date
17                }
18                // define the table expression (from clause, where clause, group clause,
19                    having clause)
20                tableExpression {
21                    // select from account and pending update tables
22                    from {
23                        account a,
24                        pending_update p
25                    }
26                    // where the account id is the same and the status is approved
27                    where {
28                        a.account_id = p.account_id
29                        and p.status = 'APPROVED'
30                    }
31                }
32            } ->
33
34            // 2nd step is insert previous results into a 3rd table
35            INSERT {
36                // define the table
37                table {
38                    approved_vendors
39                }
40                // define the columns
41                columns {
42                    vendor_id, vendor_name, approval_date
43                }
44                // define the values
45                values {
46                    result.account_id, result.account_name, result.approval_date
47                }
48            }
49        }
50    }
51 }
```

In another example embodiment, an HTTP DSL set of custom-scripted code instructions may be implemented.

```
1   httpConnector {
2       baseUrl "https://www.sample.com"
3       authType "basic"
4
5       // define available operations
6       operations {
7           // define a subscribe operation with multiple steps
8           "Subscribe" {
9               // 1st step is a POST to create the account
10              POST {
11                  // set the resource path
12                  resource "account"
13
14                  // define the request
15                  request {
16                      // use the unaltered input to the connector as the request
17                      body input.data
18                      // add a header value from an input document property with id
19 "tokenHeader"
20                      headers {
21                          "token_header": input.document.tokenHeader
22                      }
23
24                      // save the account id for later use in all requests
25                      properties.accountId = response.data.accountId
26                  }
27              } ->
28
29              // 2nd step is a PUT to enable subscriptions for the account created
30 in step 1
31              PUT {
32                  // use the account id from the previous response as part of the
33 resource
34
35              resource "account/$response.data.accountId/enableSubscriptions"
```

```
36
37                      // there's no body in this request
38
39                      // add a header value from an input document property
40                      headers {
41                          "token_header": input.document.token_header
42                      }
43                  } ->
44
45                  // 3rd step is a GET to retrieve a subscription token
46                  GET {
47                      // use the saved account id from the first request
48              resource "account/$properties.accountId/"
49
50                      // there's no body in this request
51
52                      // add a header value from an input document property
53                      headers {
54                          "token_header": input.document.token_header
55                      }
56                  } ->
57
58                  // 4th step is a POST to subscribe to the actual publication / topic
59                  POST {
60                      // use the saved account id from the first request and the object
61  type id from the operation from browse
62                          resource
63  " account/$properties.accountId/subscribe/$objectTypeId"
64
65                      // create a json payload and use it as the request body
66                      body json {
67                          // set the expiration to 30 days from now
68                  "expirationDate": currentDate + 30
69                          // set the subscription token using the value from the previous
70  response
71                          "subscriptionToken": response.data.subscriptionToken
72                      }
73
74                      // add a header value from an input document property
75                      headers {
76                          "token_header": input.document.token_header
77                      }
78                  }
79
80              // return the output of the last step as the connector output
81          }
82
83      }
84
85      // define browse / import support
86      browse {
87          "Subscribe" {
88              objectTypes {
89                  GET {
90                      // set the resource path
91                      resource "topics"
92
93                      // use the topic id and description from the response as object
94  type id and label
95                      objectTypeId = response.data.topicId
96                      objectTypeLabel = response.data.topicDescription
97
98                      // define static json profiles for the overall connector input and
99  output
100                     objectDefinition {
101                         request {
102                             json {
103                                 "firstName",
104                                 "lastName"
105                             }
106                         }
107                         response {
108                             json {
109                                 "topic",
110                                 "status",
111                                 "subscriptionId"
112                             }
113                         }
114                     }
115                 }
```

```
116        }
117      }
118    }
119  }
```

These are only a couple of example of custom-scripted code instructions of an embodiment. Any code instructions identifying an action label, operation label, or object label may comprise a custom-scripted code instruction in an embodiment. Further, such custom-scripted code instructions in various embodiments herein may be written in accordance with any known or later-developed general programming language or domain-specific language. Still further, it is contemplated that the custom-scripted code instructions in some embodiments may incorporate combinations of multiple general programming languages, combinations of multiple domain-specific languages, or combinations of both.

These custom-scripted code instructions may be stored at the technical user's or enterprise's Boomi® atom in an example embodiment. These custom-scripted code instructions in an embodiment differ from the modeled integration process code instructions in that the custom-scripted code instructions may define the labeled actions, labeled operations, or labeled objects displayed within the visual element customizer GUI for selection by a business user to customize a connector visual element.

Once a business user has modeled an integration process using one of these customized connector visual elements, the integration application management system automatically generates the modeled integration process code instructions for execution of the modeled integration process at a remote location. In doing so, the integration application management system may retrieve one or more subsets of custom-DSL code instructions associated with the labeled actions, labeled operations, or labeled objects selected by the business user within the visual element customizer GUI. As described above, the custom-scripted code instructions operating to define such labeled actions, labeled operations, or labeled objects may further associate these labeled actions, labeled operations, or labeled objects with one or more subsets of custom-DSL code instructions. These subsets of custom-DSL code instructions may comprise executable actions that may be performed as part of an executable operation on an executable object. In other words, the custom-scripted code instructions may define available functionality of the custom connector visual element, while the modeled integration process code instructions, and subsets of custom-DSL code instructions execute the integration process modeled by the custom connector visual element.

In the above example embodiments, the code instructions are written in accordance with the JDBC specification or HTTP, or another specification. In other embodiments, the code instructions entered via such a text editor in an embodiment may be written in any other general purpose or domain-specific language, or combinations thereof. As such, any reference to objects in the present disclosure may encompass any identification of datasets or other resources transmitted pursuant to a modeled integration process. Regardless of the scripting language employed, customization of a connector operation as described herein may involve associating stored subsets of code instructions with actions or objects defined using the text editor.

The custom-scripted code instructions in an embodiment may operate to label an action to be taken, then associate that action with a subset of code instructions, written in a custom DSL or general purpose computing language, for executing that action. In some embodiments involving a custom DSL, the association between the action and the subset of code instructions may involve defining the action (e.g., select) and pointing to a specification for the custom DSL that defines the proper syntax for invoking this action within code instructions written in that custom DSL. For example, the following portion of the custom-scripted code instructions may define an operation called "process pending requests," which complies with the JDBC specification stored at the base universal resource library (URL) "jdbc: postgresql:database," which defines the operations or actions that are supported by the open-source, domain-specific JDBC computing language.

```
6    operations {
7      // define a process pending operation that selects all approved accounts and
8      inserts them into a vendor table
9      "Process Pending Requests" {
10       // 1st step is select from 2 tables
11       SELECT {
```

In such an embodiment, upon compilation of this custom-scripted code instruction, the integration application management system may associate an action "select" with code instructions adhering to the specification for the JDBC DSL for executing such an action.

In another example, the following portion of the custom-scripted code instructions may define operations, for example called "subscribe" or "request," which comply with HTTP specification which define actions supported within HTTP in an example embodiment.

```
5       // define available operations
6       operations {
7           // define a subscribe operation with multiple steps
8           "Subscribe" {
9               // 1st step is a POST to create the account
10              POST {
11                  // set the resource path
12                  resource "account"
13
14                  // define the request
15                  request {
16                      // use the unaltered input to the connector as the request
17                      body input.data
18                      // add a header value from an input document property with id 19
    "tokenHeader"
20                      headers {
21                          "token_header": input.document.tokenHeader
22                      }
23
24                      // save the account id for later use in all requests
25                      properties.accountId = response.data.accountId
26                  }
```

In such an embodiment, upon compilation of this custom-scripted code instruction, the integration application management system may associate an actions "subscribe" and "request" with code instructions adhering to the specification for the HTTP DSL for executing such an action In another example, the custom-scripted code instructions at line 35 may define an action called "insert." In other embodiments involving a general purpose computing language (e.g., Java®), the technical user may be capable of setting the text editor to compile custom-scripted code instructions written in a specific general purpose computing language, directing compilation of the custom-scripted code instructions according to that general purpose computing language (e.g., using a Java® virtual machine understanding all actions or operations written in Java®).

The custom-scripted code instructions in an embodiment may also operate to label an object upon which the action may be taken, then associate that object with a subset of code instructions, written in a custom DSL or general purpose computing language, identifying that object. In embodiments in which the subset of code instructions associated with the labeled object are written in a custom DSL, this subset of code instructions may be referred to herein as custom DSL code instruction subsets.

For example, the following portion of the custom-scripted code instructions may label an object called "projection," which may be created by executing the custom DSL code instruction subset below

```
12      // define the columns to select
13      projection {
14          a.account_id,
15          a.account_name,
```

-continued

```
16          p.approval_date
17      }
```

In such an embodiment, upon compilation of this custom-scripted code instruction, the integration application management system may associate an object labeled "projection" with a custom DSL code instruction subset adhering to the specification for the JDBC DSL, given at lines 14-16. In some embodiments involving a custom DSL, the association between the object and the custom DSL code instruction subsets may involve defining or labeling the object (e.g., issue) and pointing to the location of a file containing the custom DSL code instruction subset, written in the custom DSL or general purpose computing language, identifying that object or performing the specified action on that object.

In another example, the custom-scripted code instructions at lines 18-33 in an embodiment may operate to associate another custom DSL code instruction subset given at lines 21-33 with the labeled object "tableExpression." In yet another example, the custom-scripted code instructions at lines 34-51 in an embodiment may operate to associate another custom DSL code instruction subset given at lines 36-39 with the labeled object "table," to associate a custom DSL code instruction subset given at lines 40-43 with the labeled object "columns," and to associate the custom DLS code instruction subset given at lines 45-47 with the labeled object "values."

In an HTTP DSL example, the "subscribe" operation may include subset of code instructions associated with the labeled object are written in a custom DSL as shown below.

```
88    objectTypes {
89         GET {
90              // set the resource path
91              resource "topics"
92
93              // use the topic id and description from the response as object 94
        type id and label
95              objectTypeId = response.data.topicId
96              objectTypeLabel = response.data.topicDescription
97
98              // define static json profiles for the overall connector input and 99
        output
100             objectDefinition {
101                  request {
102                       json {
103                            "firstName",
104                            "lastName"
105                       }
106                  }
107        response {
108                       json {
109                            "topic",
110                            "status",
111                            "subscriptionId"
```

Thus, in various embodiments involving a variety of custom DSLs, the association between the object and the custom DSL code instruction subsets may involve defining or labeling the object and pointing to the location of a file containing the custom DSL code instruction subset, written in the custom DSL or general purpose computing language, identifying that object or performing the specified action on that object.

Figure 4A:
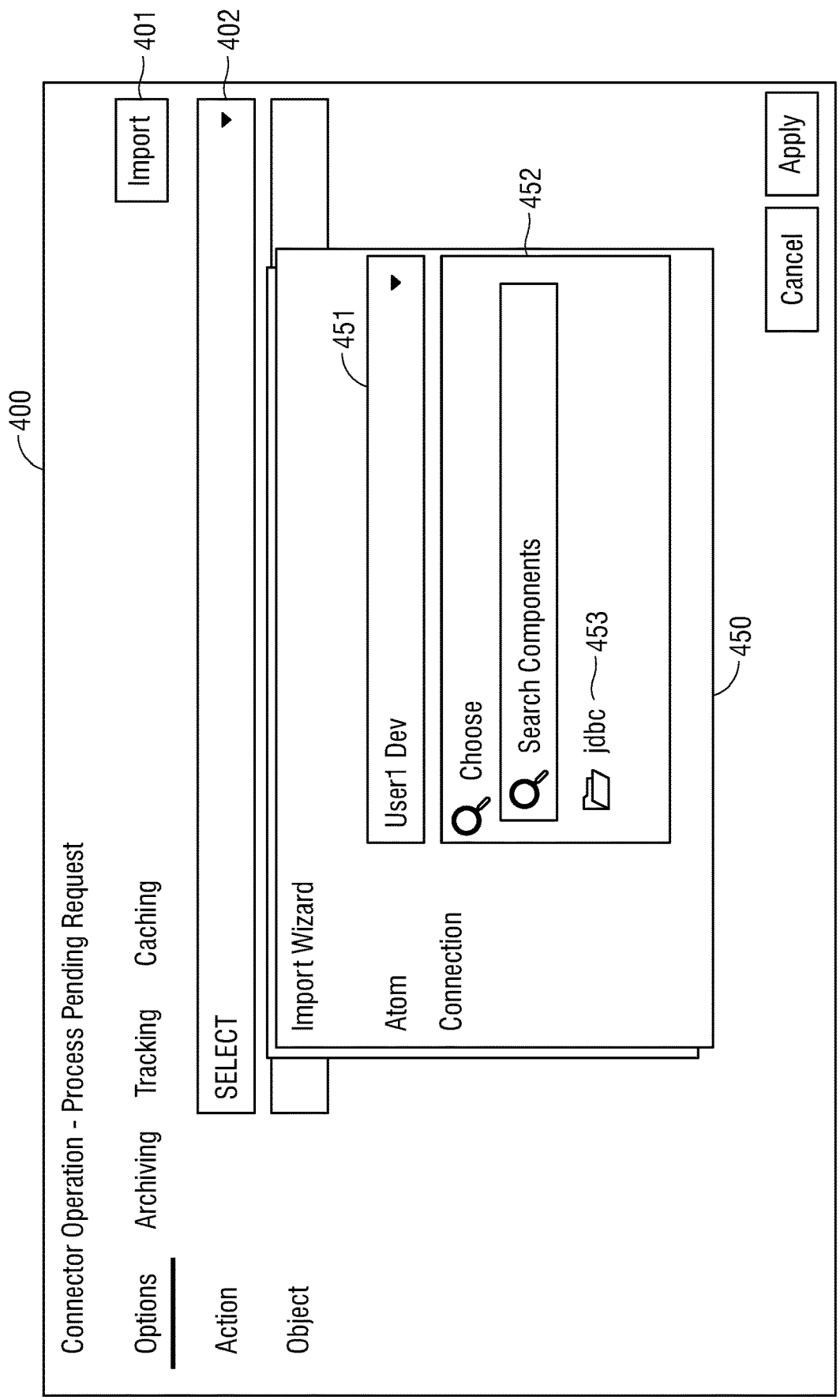
FIG. 4A is a graphical diagram illustrating a connector operation creator system graphical user interface according to an embodiment of the present disclosure.
Figure 4B:
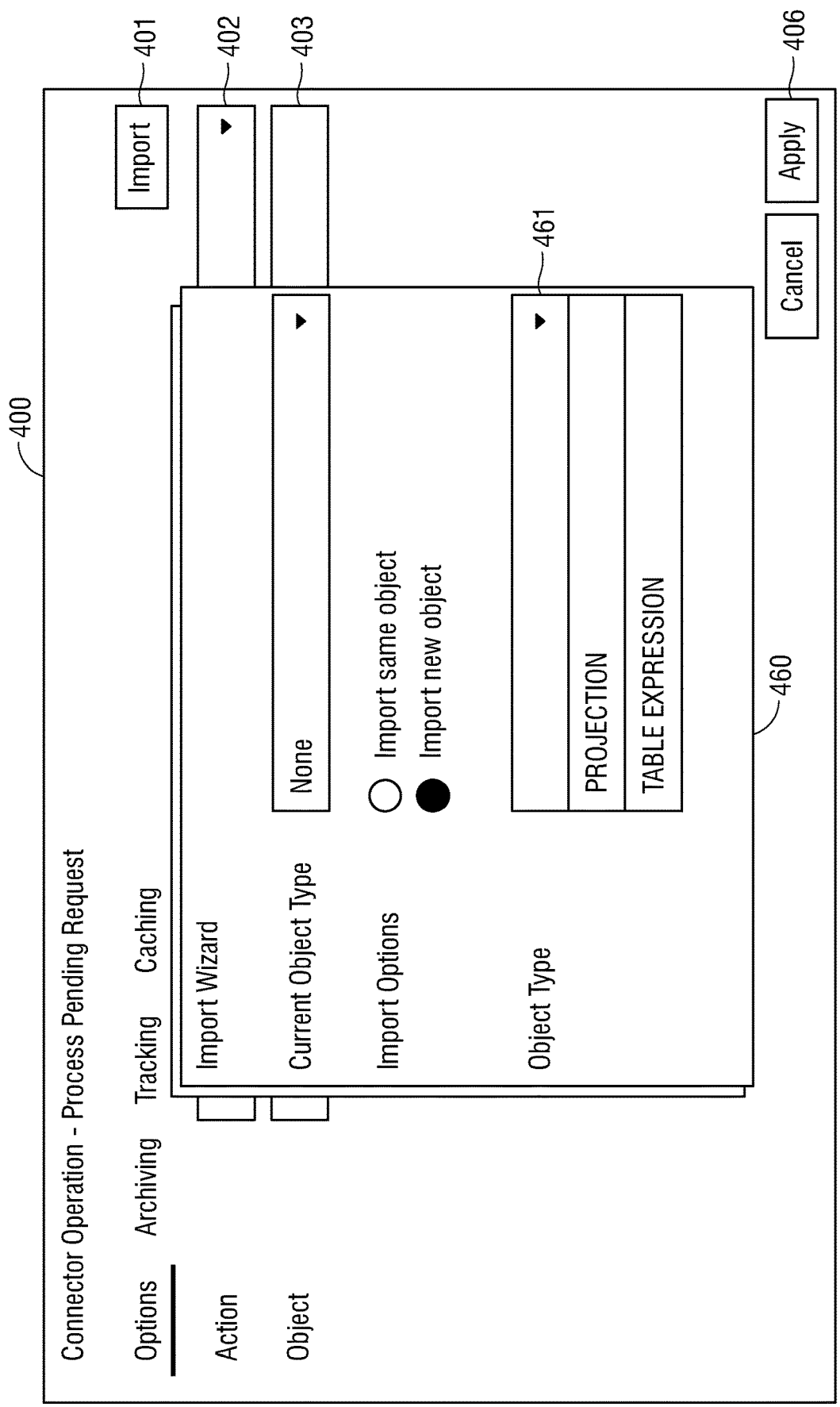
FIG. 4B is a graphical diagram illustrating a connector operation creator system graphical user interface according to another embodiment of the present disclosure.

Transmitting these custom-scripted code instructions to the connector operation creator system for tailoring a visual element customizer to a DSL in an embodiment may be a necessary first step in making each of these objects (e.g., "projection, tableExpression, table, columns, and values") available in the object type pull-down menu within the connector operation creator system GUI, as described in greater detail with respect to FIG. 4B.

In some embodiments, the custom-scripted code instructions may be written in a first DSL by the technical user or enterprise administrator, but may point to a custom DSL code instruction subset or action written in a second DSL that is the enterprise selected DSL to be used for custom connector visual element in the business integration process. The custom DSL code instruction subset for executing an operation in an embodiment may be written in the custom DSL that will be displayed via the visual element customizer GUI the business user will access to customize a selected custom connector visual element for representing an integration process task. The technical user may be more proficient in another DSL, or in a general-purpose computing language. Thus, embodiments of the present disclosure allow a technical user to tailor the visual element customizer GUI using a different selected DSL or computing language, but the visual element customizer GUI will display actions and objects compliant with the custom DSL designed to perform the process the business user wishes to execute for the enterprise, by writing custom-scripted code instructions in any DSL or general purpose language with which the technical user is most proficient or comfortable.

As described herein, the custom-scripted code instructions given above are written in accordance with the JDBC specification, HTTP specification, or Swagger specification, but in other embodiments, these custom-scripted code instructions may be written in any other general purpose or domain-specific language, or combinations thereof. Further, the specification, actions, and custom DSL code instruction subsets for executing operations defined via the custom-scripted code instructions in an embodiment may correspond to a different coding language than that used to write the custom-scripted code instructions themselves. In still further embodiments, the custom-scripted code instructions may also reference specifications, actions, and custom DSL code instruction subsets written in yet another DSL (e.g., other than the Swagger™, JDBC, or HTTP DSLs). In such a way, a custom-scripted code instruction may define actions and objects compliant with multiple DSLs. Thus, the technical user may provide custom-scripted code instructions written in a first computing language (or combination of multiple languages) for tailoring a visual element customizer tool and its visual element customizer GUI to comply with a second computing language (or combination of multiple languages).

The stored custom DSL code instruction subsets associated with actions or objects within the custom-scripted code instructions may be incorporated, in part or in whole, within the modeled integration process code instructions in an embodiment. For example, as described herein, upon compilation of the custom-scripted code instructions described directly above, the integration application management system may associate an instruction to execute a process to "select" an object labeled "projection" of the JDBC example with the subset of code instructions given at lines 11-17 which may be accessible by the integration application management system. Similarly, HTTP DSL or other DSL types with stored custom DSL code instruction subsets associated with actions or objects within the custom-scripted code instructions may be incorporated, in part or in whole, within the modeled integration process code instructions in various embodiments.

The business user may transmit an instruction to execute such a process as part of a modeled integration process by modeling the integration process with a custom connector (e.g., connector visual element 306), then customizing that connector to invoke the process to "select" an object labeled "projection" (e.g., as described in an example embodiment with reference to FIG. 4B). For example, upon receiving such an instruction, the integration application management system may retrieve the subset of code instructions given at lines 11-17 and combine these instructions with other subsets of code instructions, represented by other visual elements selected by the business user to model the integration process. In another example, the integration application management system may retrieve the subset of code instructions from the HTTP DSL custom codeset and combine these instructions with other subsets of code instructions, represented by other visual elements selected by the business user to model the integration process or from any other custom DSL in other embodiments. In such a way, the integration application management system may generate modeled integration process code instructions which include the subsets of code instructions identified within the custom-scripted code instructions to perform each of the tasks modeled by the various visual elements within the user-modeled integration process flow.

FIG. 4A is a graphical diagram illustrating a connector operation creator system graphical user interface used with a connector operation creator system for tailoring the visual element customizer tool and its visual element customizer GUI for an enterprise with a domain-specific language according to an embodiment of the present disclosure. As described herein, upon storage of custom-scripted code instructions for customizing connector visual elements for use with a domain-specific language (DSL), a technical user may use a connector operation creator system GUI 400 to define a custom operation adherent to the DSL. Such a custom operation may include an action available within the DSL, and an object upon which such an action may be taken. The technical user may choose from a list of actions available in accordance with the custom DSL via a connector operation creator system GUI 400. For example, the technical user may access such a list of available actions at the action selector 402, which may include a drop-down menu. The action selector 402 in an embodiment may allow for direct entry of text, selection of an item from a pull-down menu, or selection via a hierarchical tree, for example. In an example embodiment, the technical user may select the action "select" at 402.

The object upon which such an action may be taken may be defined by the technical user in embodiments by accessing an import wizard. The technical user may access such an import wizard 450, for example, by selecting an import button 401 within the connector operation creator system GUI 400. Via this import wizard 450, the technical user may identify the custom-scripted code instructions that identify actions the custom DSL may be capable of taking, and objects upon which those actions may be taken, as described directly above. The technical user in an embodiment may identify the custom-scripted code instruction in an embodiment by identifying a storage location for the custom-scripted code instruction. For example, the technical user of the import wizard 450 in an embodiment may select at atom selector 451 a storage repository assigned to that technical user or the technical user's enterprise (e.g., "User1Dev"). Such a storage repository may be referred to as an "atom" in some embodiments and may be located at the service provider server/system, or in a cloud computing location accessible by the service provider server/system. The technical user may further identify a specific file at file selector 452 within the storage repository identified at atom selector 451. This file may include the custom-scripted code instructions for customizing a connector visual element according to a custom DSL, as described above with reference to FIG. 3. For example, the technical user in an example embodiment may use file selector 452 to select the file "jdbc" which may hold the custom-scripted code instructions for customizing a connector visual element to display actions and operations written in the JDBC DSL. In another example embodiment, the technical user in an example embodiment may use file selector 452 to select a file "http" which may hold the custom-scripted code instructions for customizing a connector visual element to display actions and operations written in the HTTP DSL.

As described herein, the programming language underlying an integration process modeled via the integration process modeling GUI (e.g., as described with reference to FIG. 3A) may be a general-purpose programming language (e.g., Java®), a domain-specific language (e.g., Swagger™ or Era™), or a combination of both. Further, some domain-specific languages may be abstractions of known domain-specific languages. For example, Swagger™, JDBC, HTTP, and Era' or others may provide a specification describing specific actions achievable by execution of code instructions written in these DSLs. However, the specifications for each of these DSLs may invoke underlying code instructions written in Java® that are executable via a Java® virtual machine. A technical user in an embodiment may be proficient in one or more of these DSLs or general-purpose languages.

The action chosen by the technical user within the action selector 402 in other embodiments may include any actions recognized within a given DSL or a given general purpose language. For example, in an embodiment in which the technical user tailors the visual element customizer tool and its visual element customizer GUI to be compliant with the Swagger™ open-source DSL, the action chosen by the technical user within the action selector 402 may include any of the actions recognized within the Swagger™ open-source specification. These may include get, post, delete, put, patch, head, and options. In another example, in an embodiment in which the technical user tailors the visual element customizer and its visual element customizer GUI to be compliant with the JDBC open-source DSL, the action chosen by the technical user within the action selector 402 may include any of the actions recognized within the JDBC open-source specification. These may include at least the actions create, insert, update, delete, or select. In yet another example, in an embodiment in which the technical user tailors the visual element customizer and its visual element customizer GUI to be compliant with the HTTP DSL, the action chosen by the technical user within the action selector 402 may include any of the actions recognized within the HTTP specification. In still another example, in an embodiment in which the technical user tailors the visual element customizer and its visual element customizer GUI to be compliant with the Jira™ open-source DSL, the action chosen by the technical user within the action selector 402 may include any of the actions recognized within the Jira™ open-source specification. These may include at least the actions create, find, and transition. In yet another example, in an embodiment in which the technical user tailors the visual element customizer GUI to be compliant with the general purpose static query language (SQL) for querying databases, the action chosen by the technical user within the action selector 402 may include create, read, update, or delete.

The connector operation creator system for tailoring a visual element customizer to a DSL may also store an association between the action chosen by the technical user via the connector operation creator system GUI 400 and the connection selected by the user at file selector 452 for the custom DSL via the import wizard 450. For example, the connector operation creator system for tailoring a visual element customizer to a DSL may store an association between the action "select," selected by the user at action selector 402, and the connection "jdbc" 453, selected by the technical user at file selector 452. It is understood that any other custom DSL type available may be selected, but for purposes of the example shown, the connection to "jdbc" 453 is described.

FIG. 4B is a graphical diagram illustrating a connector operation creator system graphical user interface 400 of a connector operation creator system for tailoring a visual element customizer and its visual element customizer GUI to a DSL according to an embodiment of the present disclosure. The connector operation creator system graphical user interface 400 includes an import wizard 460 for importing code instructions of a DSL to be associated with a customized connector visual element illustrating another aspect according to an embodiment of the present disclosure. As described herein, the connector operation creator system for tailoring a visual element customizer to a DSL may access the identified custom-scripted code instructions. For example, the connector operation creator system for tailoring a visual element customizer to a DSL may access the custom-scripted code instructions stored at the "jdbc" location 453 described with reference to FIG. 4A.

The connector operation creator system for tailoring a visual element customizer to a DSL may parse the custom-scripted code instructions to identify one or more objects defined therein, and identify the custom DSL code instruction subsets associated with these one or more objects within the custom-scripted code instructions. For example, the connector operation creator system for tailoring a visual element customizer to a DSL in an embodiment may parse the custom-scripted code instructions described with reference to FIG. 3 to identify the objects "projection," and "tableExpression," defined therein. The connector operation creator system for tailoring a visual element customizer to a DSL in such an example embodiment may also associate these identified objects with custom-DSL code instruction subsets identified within the custom-scripted code instructions. For example, the connector operation creator system for tailoring a visual element customizer to a DSL in such an example embodiment may associate the identified object "projection," with a custom DSL code instruction subset given at lines 13-17.

Each of the objects identified within the parsed custom-scripted code instructions in such a way may then be displayed for selection by the technical user within the import wizard 460 in embodiments. For example, the connector operation creator system for tailoring a visual element customizer to a DSL in an embodiment may display the identified objects "projection," and "table expression" within the drop down menu object selector 461 of the import wizard 460. The technical user in an embodiment may then select from these available object types to define the object upon which the "projection" action selected by the user at action selector 402 may be executed. For example, the technical user in an embodiment may choose "projection," at object selector 461, and select the "apply" button at 406 to create an operation the technical user may then label as "process pending requests."

In other embodiments, the technical user may use the connector operation creator system GUI 400 and import wizard 460 in such way to select any action identified within the custom-scripted code instructions with any object upon which that action is taken within the custom-scripted code instructions. For example, the technical user or administrator may import the custom-scripted code instructions referred to within the example embodiment described with reference to FIG. 3, and may use the connector operation creator system GUI 400 to select the action "insert" with 402, and the objects "table," "columns," and "values" via 461.

Upon selection of one of these displayed objects, the connector operation creator system for tailoring a visual element customizer to a DSL may reference the specification for the DSL identified within the custom-scripted code instruction to determine the proper syntax for invoking the technical user-selected action within the connector operation creator system GUI. The connector operation creator system for tailoring a visual element customizer to a DSL may also retrieve the custom DSL code instruction subset associated with the object selected by the technical user within the import wizard 460 at object selector 461. The properly formatted invocation of the user-selected action may then be combined with the custom DSL code instruction subset associated with the user-selected object to create a custom connector operation code instruction. This custom connector operation code instruction may be stored at a location available to the integration application management system and associated with a process label set by the technical user.

For example, the connector operation creator system for tailoring a visual element customizer to a DSL may combine the command "select," which complies with the syntax required by the JDBC DSL with the custom-DSL code instruction subset given at lines 11-17. This combined action and custom-DSL code instruction subset may then be stored at a location within the technical user's or the technical user's enterprise's atom, and labeled as "process pending requests." It is appreciated that other custom-DSL code instructions may be incorporates similarly according to the above description. For example, the HTTP DSL, Swagger DSL, or others that are made available according to the embodiments of the present disclosure. In such a way, the technical user may identify the custom DSL code instruction subset the service provider will use to build the modeled integration process connector code set represented by the connector visual element customized by a business user to model an integration process.

Figure 5A:
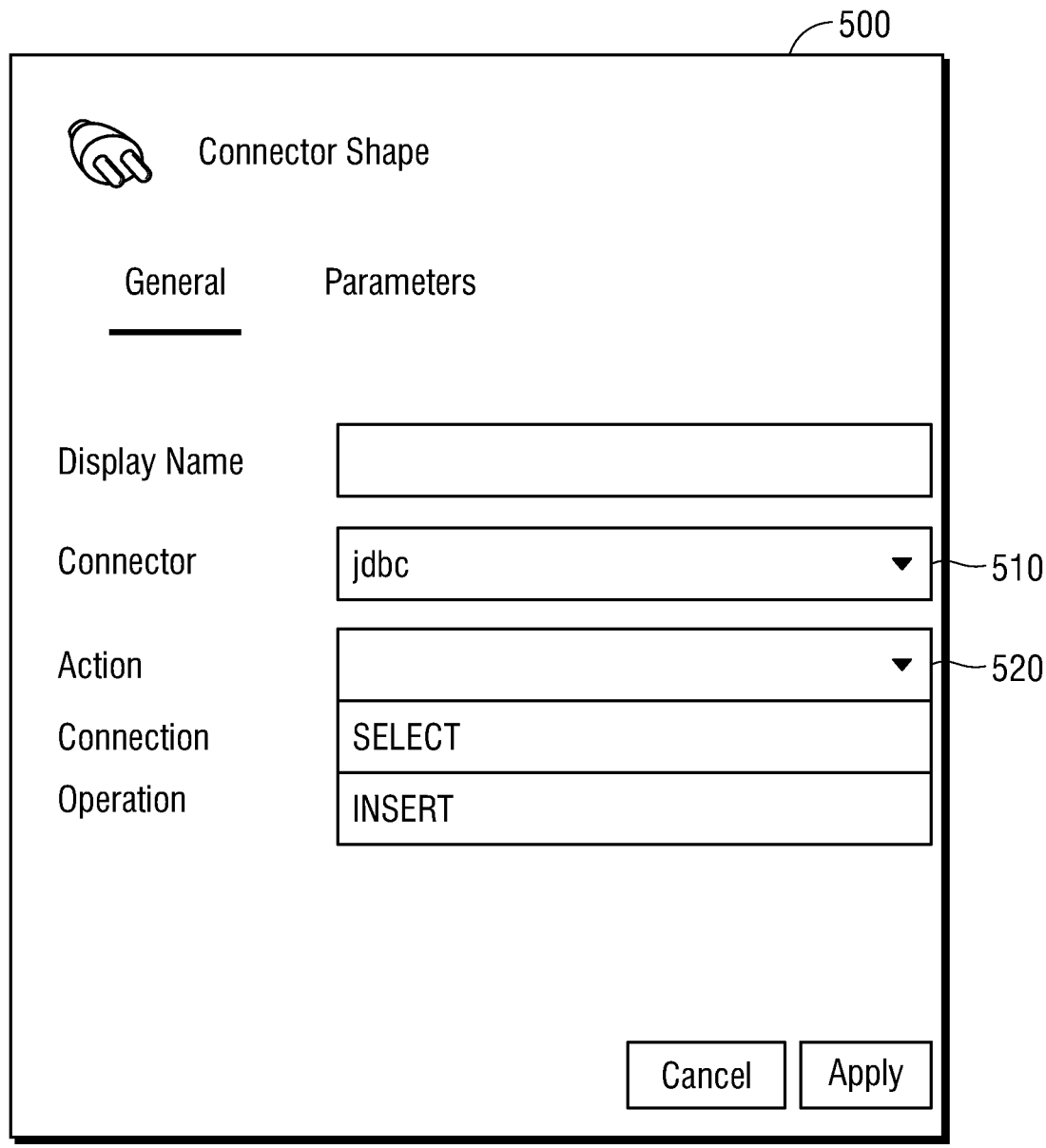
FIG. 5A is a graphical diagram illustrating a visual element customizer GUI defining an action to be taken according to an embodiment of the present disclosure.

FIG. 5A is a graphical diagram illustrating a visual element customizer GUI 500 defining an action to be taken in accordance with a custom domain-specific language according to another embodiment of the present disclosure. The visual element customizer GUI 500 is used to interface with a visual element customizer to customize the function and settings of the visual element. As described herein, once a user, such as a business user developing a business integration process, has chosen to add a connector element in an embodiment, the integration process-modeling user interface may prompt the user for further information used in customizing the connector element. For example, the integration process-modeling user interface of the integration application management system may prompt the user to provide such information via a separate visual element customizer GUI 500 in an embodiment.

The type of connector may be set by the user via a connector type selector 510, which may operate as a text box, or drop down menu, for example. The connector type provided in the connector type selector 510 may define, for example, the interface the connector element may establish in order to engage in a data transfer. An interface in such an embodiment may describe the formatting and structure of data coming into the connector, and the formatting and structure of data as it exits the connector. Examples of such interfaces in an embodiment may include application connectors providing connectivity to specific software applications such as Netsuite®, Salesforce®, or Amazon®, for example. In another embodiment, examples of such interfaces may include technology connectors providing connectivity to and from web applications, on-premise applications, and common data repositories using a standard data transport method or various protocols (e.g., hyper-text transfer protocol (HTTP), file transfer protocol (FTP), Java® message services (JMS), etc.).

In still another embodiment, examples of such interfaces in an embodiment may include custom connectors providing connectivity to custom software applications executing code instructions written in domain-specific languages (DSLs). For example, the business user may choose at connector type selector 510, the connector "jdbc," providing connectivity to an application executing code instructions written in the JDBC DSL. The type of connector selected at connector type selector 510 in an embodiment may dictate the actions, connections, or operations available for user selection, in some embodiments. As described herein (e.g., with respect to FIG. 4A), the connector operation creator system for tailoring a visual element customizer to a DSL may store an association between the action chosen by the technical user via the connector operation creator system GUI and the connection selected by the business user for the custom DSL. For example, the connector operation creator system for tailoring a visual element customizer to a DSL may store an association between the action "select," and the connection "jdbc." As described, although the selection of jdbc is described with respect to FIG. 5A, it is understood that selection of "http" or another specific connector type with a custom DSL available may be chosen at connector type selector 510. For purposes of explanation, the jdbc example is discussed.

The integration application management system may access these associations to identify one or more actions available for a given connection, as defined by the technical user via the connector operation creator system GUI. The integration application management system may then display each of these actions, as defined by the technical user, for selection by the business user with an action selector 520 within the visual element customizer GUI 500. For example, the integration application management system may display the actions "select" and "insert" in the action selector 520 for selection by the business user, based on the business user's selection of the "jdbc" type connector at connector type selector 510. In such a way, the technical user may tailor the business user's ability to customize the visual element to the actions supported by the DSL, without the business user having to learn which actions are supported by the DSL. In other embodiments, the integration application management system may receive user connector selection at 510 of the JDBC custom DSL and may access a stored specification for the JDBC custom DSL to determine a list of actions available according to that custom DSL.

It is appreciated that the technical user may tailor the business user's ability to customize the visual element to the actions supported by other available custom DSLs, without the business user having to learn which actions are supported by the DSL. In other embodiments, the integration application management system may receive user connector selection at 510 of the HTTP custom DSL and may access a stored specification for the HTTP custom DSL to determine a list of actions available according to that custom DSL for example. Additional custom DSLs may also be selected and a list of actions determined as a result.

Figure 5B:
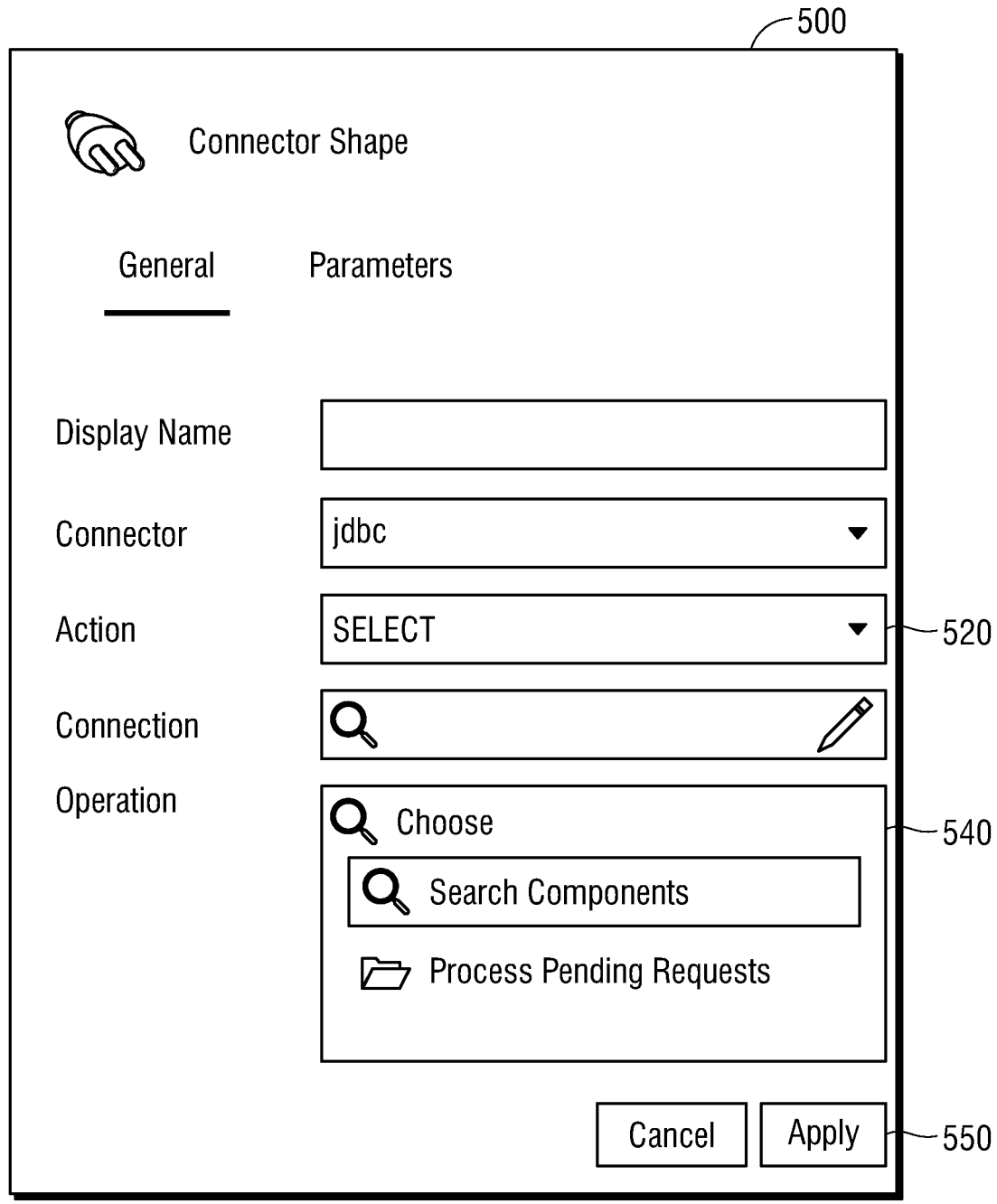
FIG. 5B is a graphical diagram illustrating a visual element customizer GUI defining an operation to be performed according to another embodiment of the present disclosure.

FIG. 5B is a graphical diagram illustrating a visual element customizer GUI 500 defining an operation to be performed in accordance with a custom domain-specific language according to another embodiment of the present disclosure. The visual element customizer GUI 500 is used to interface with a visual element customizer to customize the function and settings of the visual element. Upon storage of the custom-DSL code instructions for the labeled connector operation, the custom connector operation may become available for selection by a business user for incorporation within a modeled integration process. The connector operations made available to the business user for selection may depend, however, upon the business user's selection of an action, such as via an action selector 520 within the visual element customizer GUI 500. The integration application management system in an embodiment may receive a business user's selection of an action, then identify one or more connector operations in operation selector 540 that were defined by the technical user via the connector operation creator system GUI (e.g., as described with reference to FIGS. 4A and 4B) in which the technical user imported the same action. In such an embodiment, the integration application management system may only display, via the visual element customizer GUI 500, connector operations shown in operation selector 540 that include the action chosen by the business user within the visual element customizer GUI 500.

For example, the integration application management system in an embodiment may receive a business user's selection of the action "select" at action selector 520, and determine the stored connector process labeled "process pending requests" incorporates the action "select." As described with reference to FIGS. 4A and 4B, the connector process labeled "process pending requests" may have been previously tailored by the technical user to perform a specific action (e.g., select) on a specific object (e.g., projection), by executing code instructions written in a custom DSL (e.g., JDBC). As can be appreciated, actions from other custom DSL may also be selectable when another custom DSL selection has been made, such as the HTTP or another custom DSL for a connector type. The integration application management system in an embodiment may then display each of the connector processes defined by the technical user in such a way that incorporate the action defined by the business user at action selector 520 within the pull-down menu 540. For example, the integration application management system may display the operation labeled "process pending requests" within the pull-down menu of operation selector 540. The business user may then select the operation (e.g., "process pending requests") and press the "apply" button at 550 to finalize customization of the visual element. In such a way, the business user may customize a visual element to perform actions supported by a custom DSL on objects recognized by the custom DSL, without having to learn the syntax or structure underlying the custom DSL.

Further, the custom connector operation code instruction associated with that custom connector operation may be stored at a location available to the integration application management system. Thus, upon selection by the business user of the custom connector operation defined by the technical user, the integration application management system in embodiments may associate the custom connector visual element placed into the integration system by the business manager with the custom connector operation code instructions, written in the custom DSL. In such a way, a technical user proficient in a custom DSL may allow a business user to choose from actions supported by the custom DSL, and operations incorporating these available actions to perform on datasets identified by the technical user. This may obviate the need for the business user or an employee of the integration process modeling GUI to learn the underlying syntaxes and coding language of the custom DSL thereby simplifying development of custom connectors for particular DSL actions for an enterprise.

Figure 6:
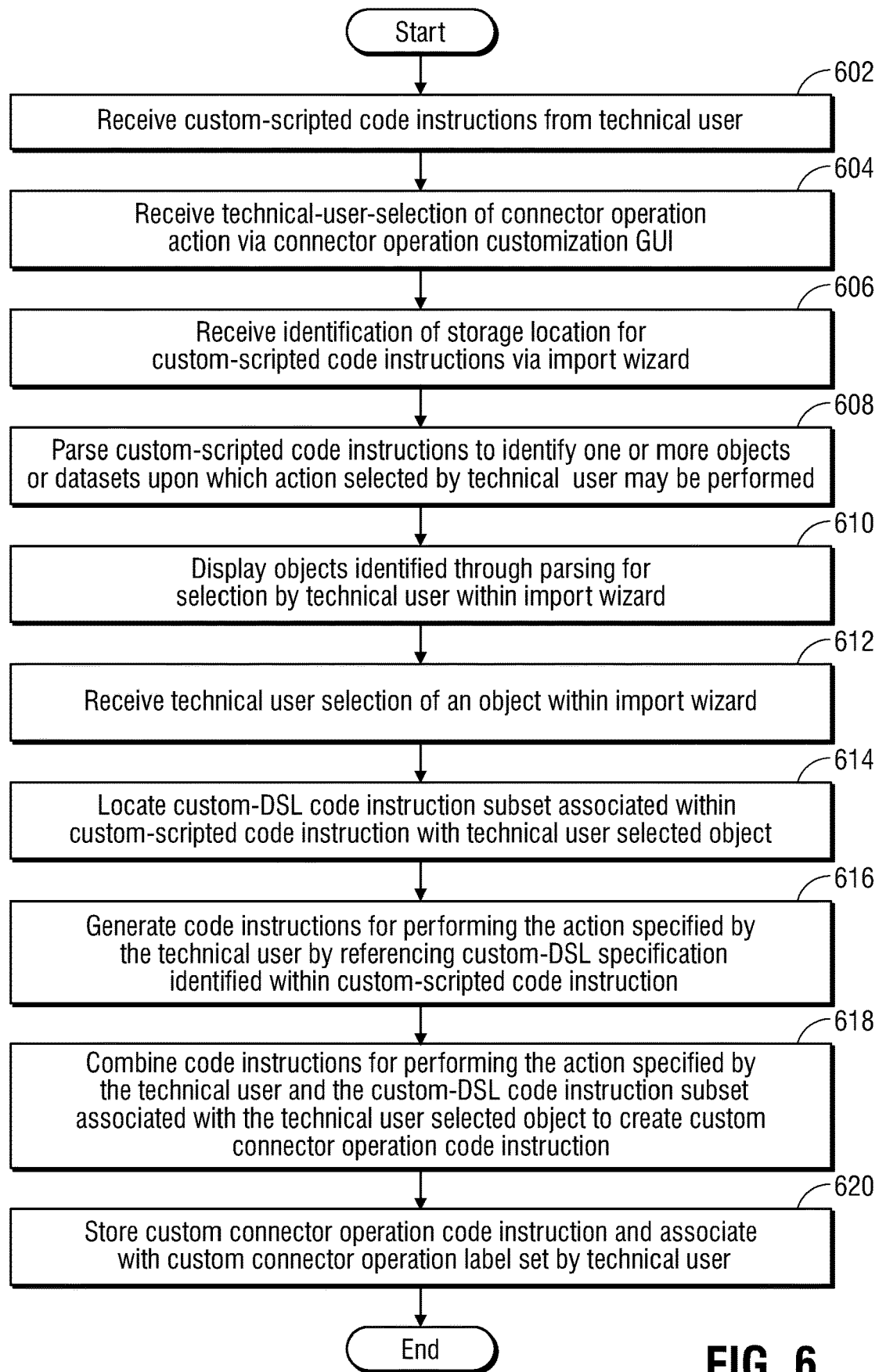
FIG. 6 is a flow diagram illustrating a method of generating custom connector operation code instructions written in a custom DSL according to an embodiment of the present disclosure.

FIG. 6 is a flow diagram illustrating a method of generating custom connector operation code instructions written in a custom DSL for selection by a business user modeling an integration process according to an embodiment of the present disclosure. As described herein, a technical user or administrator, having broader reaching privileges than a business user, may tailor functionality of a visual element customizer and its visual element customizer GUI accessible by a business owner to operate in accordance with a custom DSL. In an embodiment, a technical user or administrator may implement a connector operation creator system, with connector operation creator system GUI, to tailor a visual element customizer for a custom visual element to the custom DSL of an enterprise.

At block 602, the connector operation creator system for tailoring a visual element customizer to a DSL in an embodiment may receive a custom-scripted code instruction from a technical user. A technical user may transmit custom-scripted code instructions that identify actions the custom DSL may be capable of taking, and objects upon which those actions may be taken to the connector operation creator system for tailoring a visual element customizer to a DSL. Such custom-scripted code instructions may also associate subsets of code instructions (e.g., custom DSL code instruction subsets), written in a custom DSL, with those identified actions and objects. For example, in an embodiment described with reference to FIG. 3, custom-scripted code instructions may identify the actions "select" and "insert" which are supported by the JDBC custom DSL. In another example, custom-scripted code instructions may identify the actions "subscribe" and "request" which are supported by the HTTP custom DSL in embodiments herein.

The connector operation creator system for tailoring a visual element customizer to a DSL in an embodiment may receive a selection by the technical user of a connector operation action via a connector operation creator system GUI at block 604. For example, in an embodiment described with reference to FIG. 4A, the technical user or enterprise administrator may select the JDBC supported action "select" within the pull-down menu of action selector 402. In other example embodiments, the technical user or enterprise administrator may select the JDBC supported action "insert" within the pull-down menu of action selector 402. Similar, of a HTTP type connector is implemented, the technical user or enterprise administrator may select the HTTP supported action "subscribe" within the pull-down menu of action selector 402 or the technical user or enterprise administrator may select the HTTP supported action "request" within the pull-down menu of action selector 402. Proceeding forward with the example embodiments for FIG. 6, the selection of the JDBC custom DSL will be described in detail for brevity, but it is appreciated that other custom DSL types, including an HTTP DSL, according to embodiments may similarly be customized according to the method described in FIG. 6.

At block 606, the connector operation creator system for tailoring a visual element customizer to a DSL in an embodiment may receive identification of a storage location for the custom-scripted code instructions via an import wizard. For example, the technical user or enterprise administrator of the connector operation creator system GUI in an embodiment described with reference to FIG. 4A may access an import wizard 450 by pressing the import button 401. The technology user or enterprise administrator may then choose a connection and a location where the custom-scripted code instructions are stored. For example, the user may choose the jdbc folder 453 via the menu of connection selector 452. In other examples, a user may choose a folder relating to a different type of connector such as HTTP or others via the menu of connection selector 452.

The connector operation creator system for tailoring a visual element customizer to a DSL in an embodiment may parse the custom-scripted code instructions at block 608 to identify one or more objects or datasets upon which the action selected by the technical user or enterprise administrator may be performed. More specifically, the connector operation creator system for tailoring a visual element customizer to a DSL in an embodiment may parse the custom-scripted code instructions stored at the location defined at block 606 to identify one or more objects or datasets upon which the action selected by the technical user or enterprise administrator at block 604 may be performed. For example, in an embodiment described with reference to FIG. 4A, the connector operation creator system for tailoring a visual element customizer to a DSL may parse the custom-scripted code instructions stored in the jdbc-rest folder selected by the user at 452 to identify one or more objects or datasets upon which the action "select" selected by the technical user or enterprise administrator in the pull-down menu of action selector 402 may be performed. In an embodiment described with reference to FIG. 3, for example, the custom-scripted code instructions stored at the jdbc folder or connection may be parsed by the connector operation creator system to determine that the action "select" may be performed on the objects "projections," and "table expression." In another example, these custom-scripted code instructions may be parsed by the connector operation creator system to also determine the action "insert" may be performed on the objects "table," "columns," and "values." In yet other examples, the custom-scripted code instructions stored at the different connector type folder or connection may be parsed by the connector operation creator system to determine that the action to be performed under the different type of connector, such as HTTP or others, and parsed objects may be identified by the user.

At block 610, the connector operation creator system for tailoring a visual element customizer to a DSL in an embodiment may display within the import wizard, each of the objects identified. More specifically, the connector operation creator system for tailoring a visual element customizer to a DSL in an embodiment may display each of the objects identified through parsing at block 608 for selection by the technical user within the import wizard. For example, in an embodiment described with respect to FIG. 4B in which the user has chosen the action "select," the connector operation creator system for tailoring a visual element customizer to a DSL may cause the import wizard 460 to list within the drop-down menu 461 the objects "projection" and "table expressions." As another example embodiment in which the technical user or enterprise administrator has chosen the action "insert," the connector operation creator system for tailoring a visual element customizer to a DSL may cause the import wizard 450 to list within the drop-down menu of object selector 461 the objects "table," "columns," and "value." In yet other examples, the connector operation creator system for tailoring a visual element customizer to a DSL for a different connector type display objects specific to that DSL type, such as an HTTP DSL or others at block 608. For example, selection of a DSL type action for HTTP or another connector type may cause the import wizard 460 to list within the drop-down menu 461 the objects determined to be associated with that action to be performed under the different type of connector, such as HTTP or others.

The connector operation creator system for tailoring a visual element customizer to a DSL in an embodiment may receive a selection by the technical user of one of the objects displayed within the import wizard at block 612. For example, in an embodiment described with reference to FIG. 4B, the technical user or administrator may select the object "projection" from the pull-down menu of object selector 461. In such a way, the technical user or administrator may identify an object and an action to perform on that object as part of an operation that may be executed by code instructions represented by a connector visual element.

At block 614, the connector operation creator system for tailoring a visual element customizer to a DSL in an embodiment may locate the custom-DSL code instruction subset associated within the custom-scripted code instruction with the technical user selected object. More specifically, the connector operation creator system for tailoring a visual element customizer to a DSL in an embodiment may locate the custom-DSL code instruction subset associated within custom-scripted code instruction with the object selected by the technical user at block 612. For example, in an embodiment in which the user has selected the "projection" object, the connector operation creator system for tailoring a visual element customizer to a DSL may identify the lines 13-17 given within the custom-scripted code instructions and associated thereby with the label "projection." The connector operation creator system for tailoring a visual element customizer to a DSL may then retrieve the custom-DSL code instruction subset, written in a custom DSL, stored at that address. This may depend on which custom-DSL code set has been selected for a connector type, such that the connector operation creator system for tailoring a visual element customizer to a DSL in an embodiment may locate the custom-DSL code instruction subset associated within custom-scripted code instruction with the object selected by the technical user at block 612 for a plurality of custom-DSL code types and connector types via the connector operation creator system platform.

The connector operation creator system for tailoring a visual element customizer to a DSL in an embodiment may generate code instructions for performing the action specified by the technical user by referencing the custom-DSL specification identified within custom-scripted code instruction at block 616. The custom-DSL specification in an embodiment may define a proper syntax and structure for code instructions adhering to the custom DSL. The custom-DSL specification or a storage location therefor may be identified within the custom-scripted code instructions. For example, the custom-scripted code instructions described in an embodiment with reference to FIG. 3 may indicate the custom-DSL specification is stored at the location "jdbc: postgresql:database." The connector operation creator system for tailoring a visual element customizer to a DSL in such an embodiment may generate code instructions including the action selected by the technical user via the connector operation creator system GUI, written in the syntax required by the JDBC custom-DSL specification. It is again appreciated that connector operation creator system may also identify the custom-DSL specification or a storage location within any of a plurality of the available custom-scripted code instructions. The connector operation creator system for tailoring a visual element customizer to a DSL in such an embodiment may generate code instructions including the action selected by the technical user via the connector operation creator system GUI, written in the syntax required by whatever custom-DSL specifications are available if selected, such as HTTP DSL or others.

At block 618, the connector operation creator system for tailoring a visual element customizer to a DSL in an embodiment may combine the code instructions for performing the action specified by the technical user and the custom-DSL code instruction subset associated with the technical user selected object to create a custom connector operation code instruction. The connector operation creator system for tailoring a visual element customizer may add the custom-DSL code instruction subset retrieved at block 614 to the code instructions generated at block 616 including the action written in the syntax required by the custom-DSL. For example, the connector operation creator system for tailoring a visual element customizer may edit the code instructions generated at block 616 such that the action "select" operates on the custom-DSL code instruction subset given at lines 13-17 at block 614. Any example custom-DSL code instructions selected at this point and available via the method described via FIG. 6, such as the HTTP DSL or others, may similarly have code instructions edited at block 616 in embodiments herein.

The connector operation creator system for tailoring a visual element customizer to a DSL in an embodiment may store the custom connector operation code instruction at a location accessible by the integration application management system at block 620. The custom connector operation code instruction may also be associated with a custom connector operation label set by the technical user in an embodiment. For example, in an embodiment described with reference to FIG. 4A, the technical user may label the connector operation that includes the action "select" and the object "projection" with the name "process pending requests." The method may then end.

Figure 7:
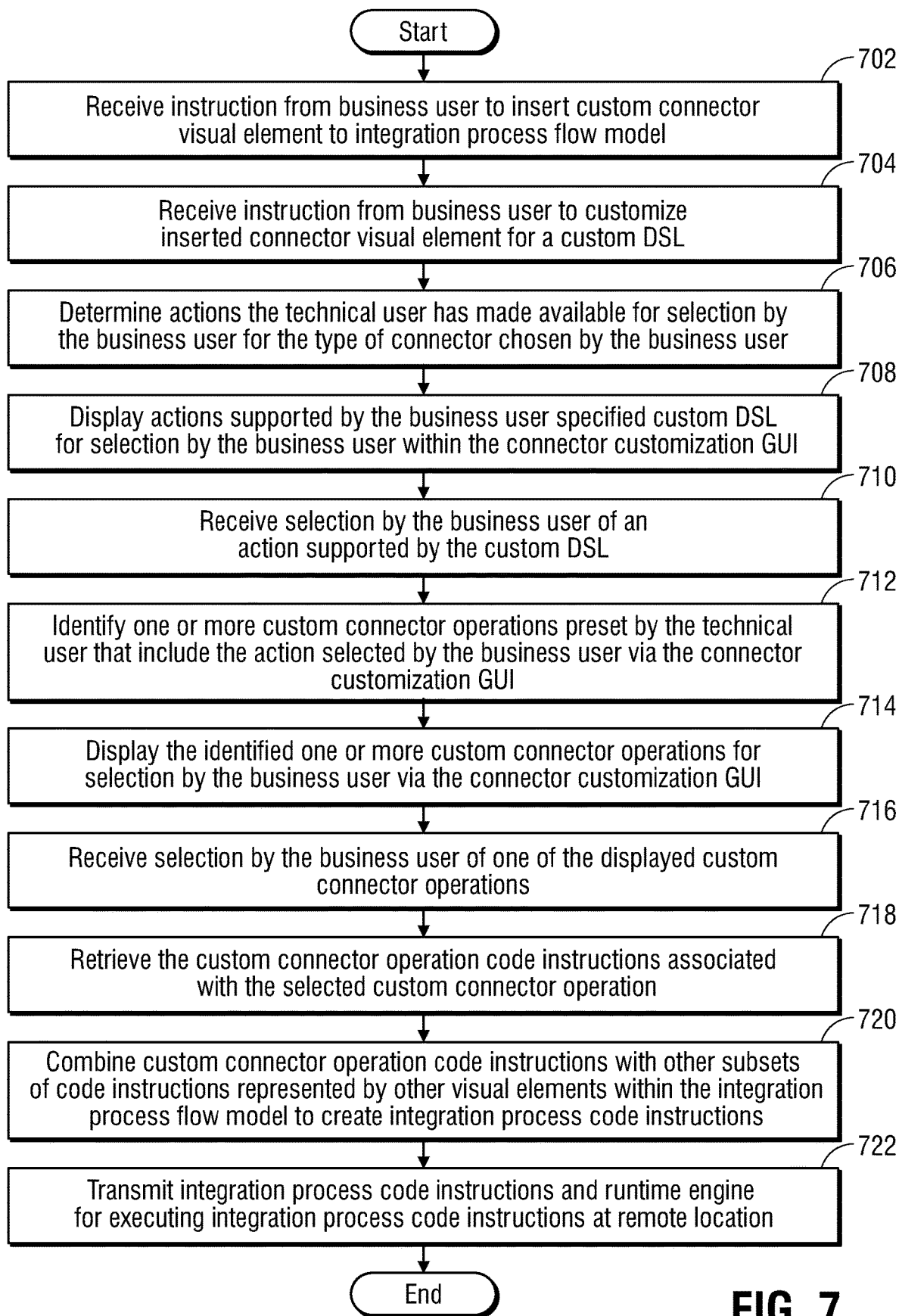
FIG. 7 is a flow diagram illustrating a method of generating modeled integration process code instructions written in a custom DSL according to an embodiment of the present disclosure.

FIG. 7 is a flow diagram illustrating a method of generating modeled integration process code instructions, at least a portion of which are written in a custom DSL, according to an embodiment of the present disclosure. As described herein, once a user has chosen to add a connector element to an integration process flow model in an embodiment, the integration process-modeling user interface may prompt the user for further information used in customizing the connector element, via a separate visual element customizer GUI. Upon storage of the custom-DSL code instructions for the labeled connector operation (e.g., as described with reference to FIG. 6), the custom connector operation may become available for selection by a business user within the integration process modeling GUI. The custom connector process of a visual element connector will be further modified by a business user with the visual element customizer GUI that has been prepared for the custom DSL by a technical user or enterprise administrator.

At block 702, the integration application management system in an embodiment may receive an instruction from a business user to insert a custom connector visual element into an integration process flow model. For example, in an embodiment described with reference to FIG. 3, the business user may model an integration process using a plurality of visual elements, each representing discrete steps or tasks. More specifically, the business user in an embodiment may insert a custom connector visual element, such as 306 shown in FIG. 3, for receiving or integrating data in one example embodiment.

The integration application management system in an embodiment may receive an instruction from a business user to customize the inserted connector visual element for a custom DSL at block 704. Upon inserting the connector visual element into a modeled integration process flow within the integration process modeling GUI in an embodiment, the integration application management system may automatically prompt the user to provide further information about the functionality of that connector element via the visual element customizer GUI. For example, in an embodiment described with reference to FIG. 5A, the business user may select a connector type within the drop-down menu of a connector type selector 510. The connector type may indicate the language in which the code instructions for executing the process modeled by the connector visual element should be written. For example, the business user may choose the connector type "jdbc" at connector type selector 510 in an embodiment, indicating the connector code instructions should be compliant with the JDBC custom-DSL. In another example, the business user may choose the connector type "http" at connector type selector 510 in an embodiment, indicating the connector code instructions should be compliant with the HTTP custom-DSL. It is understood selection at connector type selector 510 may provide a selection from a plurality of available connector types for connector code instructions that should be compliant with the corresponding custom-DSL in various embodiments.

At block 706, the integration application management system in an embodiment may determine actions supported by the custom DSL chosen by the business user. More specifically, the integration application management system in such an embodiment may determine actions supported by the custom DSL chosen by the business user at block 704. For example, in an embodiment described with reference to FIG. 4A, the technical user may generate a connector operation for performing the action "select" (e.g., selected at 402) on an object stored in the folder or connection "jdbc" 453. In other embodiments, the technical user may enter the action "insert" in the user selection action selector 402, based on the inclusion of these actions within the custom-scripted code instructions stored at the folder or connection "jdbc" identified at 453. As described before, the user action selector 402 may select actions that correspond to whatever selected available connector type, HTTP or other connector type, that was populated from selection at connector type selector 510. These may have been prepared by a technical user or administrator via the connector operation creator system in embodiments herein. The integration application management system in an embodiment may then identify one or more connector operations (e.g., "process pending requests" described at FIG. 4A) having the same connection (e.g., jdbc) as the connector type selected by the business user within the visual element customizer GUI. The actions selected by the technical user for these one or more connection operations may then be identified by the integration application management system as associated with the connector type, for example "jdbc", "http", or other types.

The integration application management system in an embodiment may display actions supported by the business user specified custom DSL for selection by the business user within the visual element customizer GUI at block 708. The actions selected by the technical user for the one or more connection operations identified at block 706 may then be listed for selection within the visual element customizer GUI. For example, in an embodiment described with reference to FIG. 5A, the visual element customizer GUI may list the actions within the pull-down menu of action selector 520 that correspond to the connector type for the custom DSL. For example, "select" and "insert" may be listed for a custom JDBC DSL code to customize a JDBC connector type. In another example, "subscribe" or other actions may be listed for custom HTTP DSL to customize an HTTP connector type.

At block 710, the integration application management system in an embodiment may receive a selection by the business user of an action supported by the custom DSL currently being customized by a business user for a customization of an integration shape. For example, in an embodiment described with reference to FIG. 5A, the business user may select the available action "select" at the pull-down menu of action selector 520. The action selected by the business user may dictate the action that will be taken at the step in the integration process modeled by the visual element being customized (e.g., connector visual element).

The integration application management system in an embodiment may identify one or more custom connector operations preset by the technical user that include the action selected by the business user via the visual element customizer GUI at block 712. The one or more custom connector operations in an embodiment may be preset by the technical user, for example, via the method described with reference to FIG. 6. These ma be plural custom connector operations for one custom-DSL type, but also, this step may apply to a plurality of custom-DSL types available for customizers for specific shapes being customized such as JDBC, HTTP, or others. For example, the technical user may preset the action and object upon which the action may be performed for a connector operation labeled "process pending requests." Upon storage of the custom connector operation code instruction for executing the operation "process pending requests," the connector operation creator system for tailoring a visual element customizer to a DSL may associate the action performed within that operation with the label for that operation. For example, the operation labeled "process pending requests" may be associated with the action "select." At block 712, the integration application management system may reference this stored association to determine that the action "select," chosen by the business user at block 710 is associated with the operation "process pending requests."

At block 714, the integration application management system in an embodiment may display the identified one or more custom connector operations for selection by the business user via the visual element customizer GUI. For example, the integration application management system may identify at block 712 that the action "select," chosen by the business user at block 710 is associated with the connector operation "process pending requests." In such an embodiment, as described with reference to FIG. 5B, the integration application management system may display the operation "process pending requests" for selection by the business user within the drop-down menu of operation selector 540. This process step at 714 may similarly apply an associated connector operation to selection of an action from other custom DSL types associated with custom connector types being customized, for example for HTTP DSL with an HTTP shape customization.

The integration application management system in an embodiment may receive selection by the business user of one or more of the displayed custom connector operations at block 716. For example, in an embodiment described with reference to FIG. 5B, the business user may select the operation "process pending requests." The operation selection at block 716 may also apply for any custom-DSL specific type that a custom shape is being customized for, such as HTTP custom connector or another available custom DSL type. The action and operations presented for selection by the business user via the visual element customizer GUI in an embodiment are limited to the operations defined by the technical user via the connector operation creator system GUI and defined with the connector operation creator system. Thus, any selections of action and operation made by the business user via the visual element customizer GUI are constrained to code instructions adhering to the custom-DSL invoked within the technical user specified custom-scripted code instructions. In such a way, a technical user proficient in a custom DSL may allow a business user to choose from actions supported by the custom DSL, and operations incorporating these available actions to perform on datasets identified by the technical user. This may obviate the need for the business user or an employee of the integration process modeling GUI to learn the underlying syntaxes and coding language of the custom DSL.

At block 718, the integration application management system in an embodiment may retrieve the custom connector operation code instructions associated with the selected custom connector operation. The custom connector operation code instructions associated with the selected custom connector operation may be stored at a location accessible by the integration application management system in an embodiment, as described, for example, with respect to FIG. 6, at block 620. Upon selection of the connector operation by the business user via the visual element customizer GUI, the integration application management system may retrieve the custom connector operation code instructions associated with the custom connector operation selected by the business user.

The integration application management system in an embodiment may combine the custom connector operation code instructions with other subsets of code instructions represented by other visual elements within the integration process flow model to create integration process code instructions or integration process connector code sets at block 720. As described herein, the custom connector operation code instructions retrieved at block 718 may be represented by only one of the visual elements used by a business user to model a full integration process flow. For example, in an embodiment described with reference to FIG. 3, the retrieved custom connector operation code instructions may be represented by the connector visual element 306. Each of the remaining visual elements shown in FIG. 3 (e.g., start element 302, branch element 304, data process element 308, map element 310, set properties elements 312a and 312b, process element 314, and stop element 316) represent other subsets of code instructions for performing other discrete tasks within the integration process. The retrieved custom connector operation code instructions may be combined with the code instructions subsets represented by these other visual elements in an embodiment in order to generate modeled integration process code instructions for executing the entire integration process modeled by each of the visual elements shown in FIG. 3.

At block 722, the integration application management system in an embodiment may transmit the integration process code instructions and runtime engine for executing the integration process code instructions at a remote location. For example, as described with reference to FIG. 2, the service provider system/server 212 hosting the integration process modeling GUI, integration application management system, connector operation creator system GUI, visual element customizer GUI, and connector operation creator system for tailoring the visual element customizer to a DSL may generate the modeled integration process code instructions described directly above. In such an embodiment, the service provider server/system 212 may also generate a runtime engine for execution of the modeled integration process code instructions. The runtime engine and modeled integration process code instructions may then be transmitted to a remote location, such as, for example, the user enterprise system/network 214, the cloud service provider 218, or the enterprise cloud 216, where the runtime engine will execute the integration process modeled by the business user via the integration process modeling GUI. The method may then end.

The blocks of the flow diagrams 6-7 discussed above need not be performed in any given or specified order and may be executed as code instructions at one or a plurality of processors during preparation and set up of a modeled integration process or of a deployed integration process as described herein. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a connector operation creator system for tailoring a visual element customizer to a domain-specific language (DSL) comprising:
   a processor executing custom-scripted code instructions for a visual element customizer, received from an administrator, where the custom-scripted code instructions are configured for a custom visual element to associate a business user-selected action and an administrator-defined operation for a discrete portion of an end-to-end business integration process required to conduct automatic transformation and transfer of data between a first database data format to a second database data format with the custom visual element that invokes a subset of custom-DSL code instructions that are written in a first custom DSL for the custom visual element to be stored among a plurality of visual elements, where a portion are non-custom visual elements, for usage by users of an integration application management system to be inserted into an end-to-end integration process flow model for the end-to-end business integration process to automatically transform and transfer the data;
a connector operation creator system graphical user interface (GUI) receiving an administrator instruction to generate a visual element customizer GUI that points a business user to select the business user-selected action for the administrator-defined operation for the discrete portion of the end-to-end business integration process that is customized for the custom visual element;
the processor receiving selections from the plurality of visual elements, including the custom visual element, for the end-to-end integration process flow model for the end-to-end business integration process to generate an executable run-time engine code instructions to conduct automatic transformation and transfer of the data between the first database data format to the second database data format with the customized visual element representing units of work to be performed within the end-to-end business integration process in the integration application management system;
the visual element customizer GUI receiving a user instruction to customize a connector process, represented by the custom visual element inserted within the end-to-end integration process flow model, to execute the business-user selected action;
the visual element customizer GUI prompting and receiving user selection of the business-user selected action, based on the user instruction to customize the connector process for the custom visual element to execute the business-user selected action; and
a network interface device transmitting an-the executable run-time engine of the end-to-end business integration process, including the subset of custom-DSL code instructions for the administrator defined operation to perform the business-user selected action of the custom visual element, for execution at a remote location as part of the end-to-end business integration process.

2. The information handling system of claim 1, wherein the custom-scripted code instructions are written in a general-purpose programming language.

3. The information handling system of claim 1, wherein the custom-scripted code instructions are written in a second DSL.

4. The information handling system of claim 1, wherein the custom-scripted code instructions are written in a combination of general-purpose programming languages.

5. The information handling system of claim 1, wherein the custom-scripted code instructions are written in a combination of a general-purpose programming language and second a DSL.

6. The information handling system of claim 1 further comprising:
the visual element customizer GUI receiving a user selection of the business user-selected action;
wherein the user selection of the action comprises the user instruction to customize the connector process to perform the business user-selected action;
the visual element customizer GUI displaying the administrator-defined operation for user selection, based on the user selection of the business user-selected action.

7. The information handling system of claim 1 further comprising:
the connector operation creator system GUI receiving a selection of the business user-selected action by the administrator; and
the connector operation creator system GUI displaying an object of the administrator-defined operation for selection by the administrator, based on the selection of the business user-selected action.

8. A method for tailoring a visual element customizer to a domain-specific language (DSL) comprising:
executing custom-scripted code instructions for a visual element customizer received from an administrator via a processor, where the custom-scripted code instructions associates a business user-selected action and an administrator-defined operation for a custom visual element for a portion of an end-to-end business integration process required to conduct automatic transformation and transfer of data between a first database data format to a second database data format with the custom visual element that invokeswith a subset of custom-DSL code instructions that are written in a first custom DSL for a-the custom visual element to be stored among a plurality of visual elements, where a portion are non-custom visual elements, for usage by users of an integration application management system to be inserted into an end-to-end integration process flow model for the end-to-end business integration process to automatically transform and transfer the data;
receiving, via a connector operation creator system graphical user interface (GUI), an administrator instruction to generate a visual element customizer GUI that points a business user to select the business user-selected action for the administrator-defined operation to customize the custom visual element;
receiving selections from the plurality of visual elements, including the custom visual element, for an end-to-end integration process flow model for the end-to-end business integration process to generate an executable run-time engine code instructions to conduct automatic transformation and transfer of the data between the first database data format to the second database data format with the customized visual elements representing units of work to be performed within the end-to-end business integration process in the integration application management system executing on a processor;
receiving, via the visual element customizer GUI, a user instruction to customize a connector process, represented by the custom visual element inserted within the end-to-end integration process flow model, to perform the business user-selected action;
prompting and receiving user selection of the business user-selected action for administrator-defined operation for the portion of an end-to-end business integration process, based on the user instruction to customize the connector process for the custom visual element to execute the business user-selected action; and
transmitting, via a network interface device, the executable run-time engine of the end-to-end business integration process, including the subset of custom-DSL code instructions for the administrator-defined operation of the custom visual element, for execution of the end-to-end business integration process at a remote location.

9. The method of claim 8 further comprising:
the visual element customizer GUI displaying the administrator-defined operation for user selection, based on the user instruction to customize the connector process to perform the business user-selected action; and
the visual element customizer GUI receiving a user selection of the operation.

10. The method of claim 8 further comprising:
receiving a selection of the business user-selected action by the administrator; and
displaying, via the connector operation creator system GUI, an object for selection by the administrator, based on the selection of the business user-selected action.

11. The method of claim 8, wherein the custom-scripted code instructions are written in a general-purpose programming language.

12. The method of claim 8, wherein the custom-scripted code instructions are written in the first DSL.

13. The method of claim 8, wherein the custom-scripted code instructions are written in a second DSL.

14. The method of claim 8, wherein the custom-scripted code instructions are written in a combination of a general-purpose programming language and the first DSL.

15. An information handling system operating a connector operation creator system for tailoring a visual element customizer to a domain-specific language (DSL) comprising:
a processor executing custom-scripted code instructions for a visual element customizer received from an administrator, where the custom-scripted code instructions are configured for a custom visual element to associate a business user-selected action label and an administrator-defined operation with a subset of custom-DSL code instructions that are written in a first custom DSL for the custom visual element as required to conduct a portion of automatic transformation and transfer of data between a first database data format to a second database data format to be stored among a plurality of visual elements where a portion are non-custom visual elements for usage by users of an integration application management system to be inserted into an end-to-end integration process flow model for visually modeling executing of the administrator-defined operation for a discrete portion of an end-to-end business integration process to automatically transform and transfer the data;
a connector operation creator system graphical user interface (GUI) receiving an administrator instruction to generate a visual element customizer GUI that points a business user to select a business user-selected action and the administrator-defined operation associated with business user-selected action label and defined by the administrator for customizing the custom visual element;
the administrator instruction comprises a selection of the business user-selected action by the administrator for presentation as at least one business user-selected action in the visual element customizer GUI for customizing the custom visual element, the selection of the business user-selected action received via a connector operation creator system GUI;
the connector operation creator system GUI displaying an object for selection by the administrator for presentation as at least one object in the visual element customizer GUI, based on the selection of the business user-selected action;
the processor receiving selections from a plurality of visual elements, including the custom visual element, for the end-to-end integration process flow model for the end-to-end business integration process to generate an executable run-time engine code instructions to conduct automatic transformation and transfer of the data between the first database data format to the second database data format with the customized visual element and other visual elements representing units of work to be performed within the end-to-end business integration process in the integration application management system;
a visual element customizer GUI receiving a user instruction to customize a connector process, represented by the custom visual element inserted within the end-to-end integration process flow model, to perform the administrator-defined operation for the business user-selected action;
the visual element customizer GUI prompting and receiving user selection of the administrator-defined operation defined by the administrator, based on the user instruction to customize the connector process for the custom visual element to execute the business user-selected action; and
a network interface device transmitting an-the executable run-time engine of the end-to-end business integration process, including the custom-DSL code instructions for the custom visual element for the discrete portion of the end-to-end business integration process, for execution at a remote location as part of the end-to-end business integration process.

16. The information handling system of claim 15 further comprising:
the visual element customizer GUI receiving a user selection of the business user-selected action;
wherein the user selection of the business user-selected action comprises the user instruction to customize the connector process to perform the business user-selected action;
the visual element customizer GUI displaying the administrator-defined operation for user selection, based on the user selection of the business user-selected action.

17. The information handling system of claim 15, wherein the custom-scripted code instructions are written in a general-purpose programming language.

18. The information handling system of claim 15, wherein the custom-scripted code instructions are written in a second DSL.

19. The information handling system of claim 15, wherein the custom-scripted code instructions are written in a combination of a general-purpose programming language and the first or second DSL.

20. The information handling system of claim 15, wherein the custom-scripted code instructions are written in a combination of plural DSLs.

* * * * *